(12) United States Patent
Hyakutake et al.

(10) Patent No.: US 6,978,623 B2
(45) Date of Patent: Dec. 27, 2005

(54) GAS TURBINE, DRIVING METHOD THEREOF AND GAS TURBINE COMBINED ELECTRIC POWER GENERATION PLANT

(75) Inventors: Yoshinori Hyakutake, Hyogo (JP); Yasuhiro Fujita, Hyogo (JP)

(73) Assignee: Mitsubishi Heavy Industries, LTD, Tokyo (JP)

( * ) Notice: Subject to any disclaimer, the term of this patent is extended or adjusted under 35 U.S.C. 154(b) by 134 days.

(21) Appl. No.: 10/241,493

(22) Filed: Sep. 12, 2002

(65) Prior Publication Data

US 2003/0046939 A1 Mar. 13, 2003

(30) Foreign Application Priority Data

Sep. 13, 2001 (JP) ................................. 2001-278825
Oct. 10, 2001 (JP) ................................. 2001-312980

(51) Int. Cl.⁷ ............................................. F02C 7/16
(52) U.S. Cl. ................................. 60/806; 415/114
(58) Field of Search ..................... 60/39, 182, 39.54, 60/806; 415/114

(56) References Cited

U.S. PATENT DOCUMENTS

| | | |
|---|---|---|
| 4,982,564 A | 1/1991 | Hines |
| 5,388,960 A | 2/1995 | Suzuki et al. |
| 5,758,485 A | 6/1998 | Frutschi |
| 6,367,242 B1 * | 4/2002 | Uematsu et al. .......... 60/39.182 |

FOREIGN PATENT DOCUMENTS

| | | |
|---|---|---|
| EP | 0919706 A2 | 6/1999 |
| EP | 1 098 070 | 5/2001 |
| JP | 8-270459 | 10/1996 |
| JP | 9-209779 | 8/1997 |
| JP | 10-18809 | 1/1998 |
| JP | 10-193413 | 7/1998 |
| JP | 11-210411 | 8/1999 |
| JP | 11-241604 | 9/1999 |
| JP | 2001-193413 | 7/2001 |

* cited by examiner

Primary Examiner—Louis J. Casaregola
(74) Attorney, Agent, or Firm—Oblon, Spivak, McClelland, Maier & Neustadt, P.C.

(57) ABSTRACT

A steam temperature Ts and a casing air temperature Ta are measured by thermometers. The measurement results are taken into measuring devices and converted into electric signals. The electric signal is A/D converted by the measuring device and then, is sent to a control apparatus where a difference between both the temperature is calculated by a subtracter of a processor provided in the control apparatus. When an absolute value ΔT=|Ta−Ts of this difference is contained within 10° C. continuously ten times, a control signal is sent from a computing unit to a controller which is the control section, a pressure adjusting valve and the like are controlled and a cooling medium is switched to steam.

9 Claims, 14 Drawing Sheets

GAS TURBINE, DRIVING METHOD THEREOF AND GAS TURBINE COMBINED ELECTRIC POWER GENERATION PLANT

BACKGROUND OF THE INVENTION

1) Field of the Invention

This invention relates to a gas turbine using steam for cooling a high temperature member, a driving method of the gas turbine and a gas turbine combined electric power generation plant.

2) Description of the Related Art

At present, in order to enhance thermal efficiency in a gas turbine combined cycle, there is an increasing popular technique in which steam is used as a cooling medium instead of air, thereby cooling, by steam, a high temperature part such as a moving blade or stationary blade of the gas turbine. Here, a low pressure specific heat of dry steam is cp=1.86 kJ/kgK under a standard state, which is about two times of a low pressure specific heat of air (cp=1.00 kJ/kgK). Therefore, thermal capacity is greater and endothermic effect is higher as compared with air of the same mass as steam. Further, when wet steam is utilized as the cooling medium, wet latent heat of vaporization can also be utilized for cooling and thus, endothermic effect is enhanced. When steam is used as the cooling medium in this manner, it is possible to enhance the cooling efficiency as compared with a case such that air is used. Therefore, it is possible to increase a temperature of combustion gas around a turbine inlet and as a result, it is possible to enhance the thermal efficiency.

Conventionally, air from a compressor is used for cooling a moving blade and a stationary blade of a turbine, but when the compressed air is used for cooling the blades, working power which can be taken out from the turbine is reduced. When steam is used instead of air, cooling air for the moving blade and the stationary blade can be omitted, the working power which can be collected by the turbine is increased correspondingly, and the electric power generating efficiency is enhanced.

FIG. 14 is a partial sectional view of a gas turbine in which steam cooling is applied to the moving blade and the stationary blade. FIG. 15 is a schematic diagram which shows the gas turbine combined plant in which the steam cooling is employed for a high temperature part. In this gas turbine combined electric power generation plant, thermal energy of exhaust gas of the gas turbine is recovered by an HRSG (Heat Recovery Steam Generator: exhaust heat recovery boiler) 370. Steam is generated by the thermal energy of the exhaust gas of the gas turbine. This high temperature and high pressure steam is first supplied to a high pressure steam turbine 350 to drive the same, and electric power is generated by an electric generator 355 connected to the high pressure steam turbine 350.

Steam which worked in the high pressure steam turbine 350 is introduced into a moving blade 321 through a steam supply pipe 311 provided in the turbine main shaft 310 of the gas turbine. Further, steam is supplied to a stationary blade 325 from a steam supply port 330 provided outside a casing of the gas turbine. Here, cooling flow passages are provided in the moving blade 321 and the stationary blade 325. Steam introduced into the moving blade 321 or the stationary blade 325 absorbs heat of the combustion gas from an inner wall surface of the flow passage while the steam passes through the cooling flow passage, and the steam is discharged out from the flow passage. Then, steam which is already used to cool the moving blade 321 passes through a steam recovery pipe 312 provided in the turbine main shaft 310, and steam which is already used to cool the stationary blade 325 is discharged out from the gas turbine through the steam recovery port 331.

This cooling steam is introduced into a mixer 360 where the steam is mixed with cooling steam which is already used to cool a combustor receiver or the like and then, the steam is used as working fluid for driving a intermediate pressure steam turbine 351 or a low pressure steam turbine 352. Steam which is already used to drive the intermediate pressure steam turbine 351 or the low pressure steam turbine 352 is returned to water and then is supplied to the HRSG 370 by a pump, and the process is repeated again.

In the case of a conventional gas turbine in which steam cooling is applied to a high temperature member such as the moving blade and the stationary blade, for a while after start of the turbine, a portion of combustion air sent from a compressor is used to warm a rotor disk or the moving blade. This is because that when the moving blade, the stationary blade or the rotor disk is cooled by high temperature and high pressure steam immediately after the start of the gas turbine, thermal shock is generated by an abrupt temperature difference, and a problem is caused in such member sometimes. At the worst, such a member is damaged, and the gas turbine can not be driven. When air used for warming up is switched to steam and there exists a temperature difference between the air and the steam, however, the thermal shock is caused in the moving blade or the stationary blade to cause a problem there in indifferent degrees sometimes.

To solve this problem, Japanese Patent Application Laid-open No. 10-18809 discloses a technique in which air compressed is bled from an intermediate portion of a compressor, a high temperature portion of a gas turbine is cooled, and when air is switched to steam as the cooling medium, temperatures of the air and steam are controlled to eliminate the temperature difference. However, since the cooling air is bled from the intermediate portion of the compressing stage in the compressor, the driving state of the compressor becomes unstable due to stalling of the blade and as a result, cooling state of the high temperature portion also becomes unstable sometimes. Further, cooling air supplied to the moving blade becomes unstable and as a result, it becomes difficult to maintain a temperature of the high temperature portion constant, and the driving state of the gas turbine becomes unstable sometimes. It is difficult to maintain a stable driving state in this gas turbine, and a trip of the gas turbine is caused sometimes.

Each of the movable and stationary blades of a gas turbine is provided therein with a cooling flow passage through which cooling medium flows. A temperature of the moving blade and the stationary blade is not sufficiently warmed immediately after the driving of the gas turbine, and when the temperature thereof is lower than a temperature of saturated steam of the cooling steam, the cooling steam is condensed and becomes a drop of water. When the gas turbine is started after its operation is stopped, the cooling steam which flowed during the previous driving is condensed and becomes a drop of water and stays in the cooling flow passage sometimes.

Especially the moving blade rotates at high speed, and its rotation radius is great. Therefore, extremely large centrifugal acceleration as great as about 50000 to 100000 m/s² is applied to the moving blade. Therefore, when a drop of water formed by condensing the steam exists in the cooling flow passage of the moving blade, the extremely great centrifugal acceleration is applied to the drop of water. Even when the amount of the drop of water is very small, the rotation balance of the gas turbine is largely broken to generate vibration, and at the worst, trip of the gas turbine is generated.

To solve this problem, there is conventionally used a technique in which air is allowed to flow through a cooling flow passage provided in each of a moving blade and a stationary blade before air is switched to steam as a cooling medium, cooling steam which also warm the moving blade or the like is condensed and becomes a drop of water, and the drop of water is purged. In order to obtain more complete purge, Japanese Patent Application Laid-open No. 11-93693 discloses a driving method of a combined cycle electric power generation plant in which after a high temperature part of a gas turbine is maintained in a vacuum state, a purge operation, a warming operation, a steam cooling operation and a stopping operation are sequentially carried out. Even when a drop of water completely remained in the cooling flow passage is purged, when the air is switched to steam as the cooling medium, vibration of a shaft in a rotor system of a gas turbine exceeds a permissible value sometimes. There still remains a problem that when the cooling medium is switched, trip of gas turbine is generated.

In a gas turbine in which the steam cooling is applied to a conventional high temperature member such as a moving blade, a stationary blade and the like, the moving blade and the stationary blade are independently provided with steam supply systems to cool the moving blade and the stationary blade. Therefore, a great amount of steam is required for cooling the moving blade and the stationary blade. Further, the speed of the gas turbine is increased after the start of the turbine and the gas turbine is brought into a constant speed (3000 or 3600 rmp) operating state. For a while after the gas turbine is started, rotation systems such as the moving blade, a turbine main shaft and the rotor disk are warmed. At that time, casing air supplied from a casing warms these parts and the casing air is about 400° C.

When the warming up is completed, the cooling medium of the moving blade is switched from the casing air into steam generated in the HRSG. At that time, it is necessary to uniform temperatures of the casing air and the steam so as to prevent the vibration of the shaft. At the time of the warming up operation, since a load of the gas turbine is low, a temperature of exhaust gas is about 300° C. Therefore, in the case of the casing air having a temperature of about 400° C., it is necessary to reduce its temperature by about 100° C. by means of a cooling unit before it is used for warming the moving blade and the like. Further, energy for cooling the casing air is required, and since the casing air is cooled before it is used, time is required for warming the moving blade and the like, and waste of fuel is generated correspondingly. In the gas turbine using the steam cooling system, there is a problem that a starting loss, i.e., cost capable of obtaining a rating output from the start of the gas turbine is increased.

SUMMARY OF THE INVENTION

It is an object of the present invention to provide a gas turbine capable of achieving at least one of minimization of trip of a gas turbine by suppressing vibration of a main shaft, suppression of starting loss of a gas turbine using steam cooling system so that the gas turbine can be operated efficiently when a cooling medium of a high temperature member is switched from air to steam. It is also an object to provide a control apparatus of the gas turbine, a driving method of the gas turbine, a computer program and a gas turbine combined electric power generation plant.

According to one aspect of the present invention, there is provided a gas turbine comprising: a high temperature member of the gas turbine which uses a gas turbine casing air and steam as cooling medium in a switching manner and which is provided therein with a cooling flow passage; a steam supply unit such as a boiler or the like which supplies cooling steam to the high temperature member; a casing air supplying unit which has an air temperature adjusting unit capable of adjusting air temperature of the gas turbine casing supplied to the high temperature member by controlling at least one of a mixing ratio of air having different temperatures and a cooling amount of air; and a cooling medium switching unit which equalize casing air temperature and steam temperature by the air temperature adjusting unit and then, which switches the cooling medium for the high temperature member from the casing air to the steam.

According to the above aspect, when the cooling medium which cools the high temperature member of the gas turbine such as the moving blade is switched from the casing air to steam formed by the HRSG, temperatures of the casing air and the steam are equalize and the cooling medium is switched by a switching unit such as a valve. In the gas turbine employing the steam cooling system, a portion of combustion air formed by a compressor is bled to cool the high temperature member until sufficient cooling steam is generated by exhaust gas of the gas turbine. When the sufficient cooling steam is generated by its own exhaust gas, the cooling medium is switched from the casing air to the steam generated by the HRSG.

According to the above aspect, when a temperature difference between the casing air and the steam is great, the shaft vibration of the entire rotor system including a turbine main shaft, a rotor disk and the like of the gas turbine is increased and it exceeds the permissible value sometimes. Especially when shaft vibration of the turbine main shaft exceeds the permissible value, since it is danger to further drive the gas turbine, the operation of the gas turbine is stopped (tripped). When such a trip of the gas turbine is generated in an actual electric power generation plant, electric power can not be supplied on schedule sometimes, which causes a bottleneck in service.

According to the above aspect, the shaft vibration of the entire rotor system including the turbine main shaft is caused when temperature distribution is generated in a circumferential direction of the turbine main shaft or when a temperature distribution is generated in a circumferential direction of a rotor disk connected to the turbine main shaft. Here, when temperatures of the casing air and the steam to be switched are equalized, the temperature distribution is reduced, and it is possible to contain the shaft vibration of the entire rotor system within the permissible value. With this, the trip of the gas turbine at the time of switch of the cooling medium can be avoided and thus, the gas turbine can reliably be driven stably. Further, since the generation ratio of the trip in the gas turbine combined electric power generation plant is extremely reduced, electric power can be supplied on schedule. In this gas turbine, since the shaft vibration of the entire rotor system when the cooling medium is switched can be suppressed to a degree equal to or lower than the permissible value, it is possible to switch the cooling medium from the casing air to the steam at the parallel-in period of the gas turbine. Thus, it is possible to shorten the time required until the rating load, and the starting loss can be reduced. Here, the term "gas turbine is connected to an electric generator" means that an electric generator is connected to a gas turbine singularly operated to generate electric power.

According to the above aspect, the expression that temperatures of the casing air and the steam are an equalized means that temperatures thereof are ideally equalized, but when the temperature difference therebetween in the actual case is 15° C. or less, the shaft vibration of the turbine main shaft and the stationary blade of the entire rotor system can be suppress within the permissible value. However, the condition that the temperature difference is within 15° C. is close to a tolerance limit of the shaft vibration. Therefore, in order to more stably switch the cooling medium, the temperature difference is preferably in a range of 12 to 13° C., and more preferably temperature difference is 10° C. in view of safety.

According to the above aspect, examples of the high temperature members of the gas turbine are the moving blade, the turbine main shaft, the rotor disk, the stationary blade and the like, but in this invention, vibration caused by unbalance of the rotation system due to temperature distribution becomes a problem. Thus, examples of the high temperature members in this invention are especially the moving blade, the turbine main shaft and the rotor disk (and so forth) Further, in this invention, a temperature of the casing air and a temperature of steam are equalized by an air temperature adjusting unit. Here, in order to control a mixing ratio of air having different temperatures, a mixing ratio of casing air which passes through a heat exchanger which cools air and casing air which does not passes through the heat exchanger is changed, thereby adjusting a temperature of a casing air after it is mixed. Further, as control of a cooling amount of air, there are a cooling method for changing the number of fans which cool the heat exchanger through which the casing air flows, and a cooling method for changing the number of fans.

According to the above aspect, until the cooling medium is switched to the steam after the start of the gas turbine, casing air bled from the casing is used to warm and cool the moving blade, the turbine main shaft or the rotor disk. Conventionally, this air is bled from an intermediate portion of the compressor. When air is bled from a place where air flows in this manner, the operating state of the compressor becomes unstable due to lost of speed of the blade and as a result, the moving blade, the turbine main shaft and the like are insufficiently warmed or cooled sometimes. Since the air bled halfway through the compressed operation and thus its pressure is low, and sufficient pressure for flowing through the cooling flow passage provided in the moving blade can not be obtained sometimes. As a result, cooling failure of the moving blade is generated sometimes. On the other hand, the casing is a place where completely compressed air is temporarily stored, kinetic energy of air flow is converted into pressure energy. Therefore, a sufficient pressure for allowing the air to flow through the cooling flow passage provided in the moving blade can be obtained. Therefore, when casing air bled from the casing is used, it is possible to stably warm and cool the moving blade and the turbine main shaft and thus, the trip can also be avoided.

According to another aspect of the present invention, there is provided a gas turbine comprising: a high temperature member of the gas turbine which uses a gas turbine casing air and steam as cooling medium in a switching manner and which is provided therein with a cooling flow passage; a steam supply unit such as a boiler or the like which supplies cooling steam to the high temperature member; a water-injecting unit provided between the high temperature member and the steam supply unit and which injects water to the cooling steam and adjusts at least one of the water injecting amount or a water temperature, thereby adjusting a temperature of the steam; an air supply unit which supplies casing air of the gas turbine to the high temperature member; and a cooling medium switching unit which equalizes a casing air temperature and a steam temperature by adjusting the cooling steam temperature by the water-injecting unit and then, which switches the cooling medium for the high temperature member from the casing air to the steam.

According to the above aspect, when the cooling medium is switched from casing air to steam, water is injected to the steam to adjust a temperature of the steam, and temperatures of the casing air and the steam are equalized. When water is injected to the steam, a temperature of the steam is abruptly lowered. Therefore, in order to control the temperature swiftly, it is better to adjust a temperature of the steam than adjusting a temperature of the casing air. With this method, since the temperatures of the casing air and the steam can be equalized, it is unnecessary to spend time for adjusting a temperature, and it is possible to equalize the temperatures of the casing air and the steam temperature, it is unnecessary to spend time for adjusting the temperature and therefore, the gas turbine can proceed to the rating operation within a shorter time. Further, it is possible to suppress the starting loss.

According to the above aspect, a water-injecting unit is used for adjusting the steam temperature. A water spray is provided in an intermediate portion of a pipe of steam, and high pressure water is injected from this water spray. It is possible to adjust a temperature of steam by adjusting at least one of water injecting amount and water temperature. Water having different temperatures may be prepared, and necessary water temperature and injection amount may be calculated from a specific heat of the steam based on deviation between the casing air temperature and steam temperature. This method is preferable because the casing air temperature and steam temperature can be equalized within a shorter time. The adjustment of the steam temperature by water injection only can lower the steam temperature, this adjusting method can be applied to a case such that the steam temperature is higher than the casing air temperature. Therefore, in an actual driving, it is preferable to equalize the casing air temperature and the steam temperature in a state in which the steam temperature is higher than the casing air temperature.

According to still another aspect of the present invention, there is provided a gas turbine comprising: a high temperature member of the gas turbine which uses a gas turbine casing air and steam as cooling medium in a switching manner and which is provided therein with a cooling flow passage; a steam supply unit such as a boiler or the like which supplies cooling steam to the high temperature member; a water-injecting unit provided between the high temperature member and the steam supply unit and which injects water to the cooling steam and which adjusts at least one of the water injecting amount or a water temperature, thereby adjusting a temperature of the steam; a casing air supply unit which has at an adjusting unit capable of adjusting an air temperature of the gas turbine casing supplied to the high temperature member by controlling at least one of a mixing ratio of air having different temperatures and an air cooling amount; and a cooling medium switching unit which equalizes a casing air temperature and a steam temperature by controlling at least one of the water-injecting unit and the air temperature adjusting unit and then, switches the cooling medium for the high temperature member from the casing air to the steam.

According to the above aspect, when the casing air temperature and the steam temperature are equalized, both the temperatures are equalized by at least one of the air temperature adjusting unit and the water-injecting unit which adjust the steam temperature both equalize both the temperatures. In this gas turbine, the casing air temperature and the steam temperature can be equalized using both the air temperature adjusting unit and the water-injecting unit. In this case, it is possible to equalize both the temperatures more swiftly than the gas turbine. Therefore, the turbine can proceed the rating operation within a shorter time, and the starting loss can be reduced.

According to the above aspect, when the casing air temperature and the steam temperature are equalized, it is preferable that the steam temperature is brought higher than the casing air temperature and then the cooling medium is switched. In this gas turbine, the casing air temperature and the steam temperature can be equalized by selecting or using both the air temperature adjusting unit and the water-injecting unit. In this case, it is possible to equalize both the temperatures without waiting until the steam temperature is brought higher than the casing air temperature and thus, the turbine can proceed the rating operation faster correspondingly, and the starting loss can be reduced.

According to still another aspect of the present invention, there is provided a gas turbine comprising: a compressor which compresses air to form combustion air; a combustor which burns fuel and the combustion air generated by the compressor; high temperature members of the gas turbine such as a moving blade, a stationary blade and the like provided therein with a cooling flow passage, in which a temperature of the combustor increased by the combustion gas of the combustor when at least steam is supplied to the cooling flow passage is cooled; and a turbine driven when combustion gas from the combustor is injected to the moving blade, wherein steam which ib already used to cool at least one of the high temperature members is used as cooling steam for at least one high temperature member other than the at least one high temperature member which is cooled.

According to the above aspect, steam which is already used to cool a high temperature member of the gas turbine which requires cooling is used for cooling a moving blade and a combustor which are high temperature members required to be cooled like the stationary blade or combustor receiver. Therefore, since steam whic is already used to cool a high temperature member can be used for cooling another high temperature member, it is possible to reduce the amount of steam used correspondingly. As a result, it is possible to reduce the starting loss between the start and the rating operation of the gas turbine. Since the steam which corresponds to a temperature level of a high temperature member which is to be cooled can be supplied, labor for adjusting a temperature can be reduced. Further, steam which is already used to cool different high temperature members is mixed and it can be used as cooling steam for another high temperature member. Since steam having a temperature suitable for each high temperature member can be formed by mixing steam after cooling at an appropriate ratio, a temperature can be adjusted easily.

According to still another aspect of the present invention, there is provided a control apparatus which switches a cooling medium supplied to a high temperature member of a gas turbine to steam, the control apparatus comprising: a steam supply unit which supplies steam to a high temperature member of the gas turbine; a water-injecting unit which injects water to steam to adjust a steam temperature; an air temperature adjusting unit which controls at least one of a cooling amount of air and a mixing ratio of air having different temperatures, thereby adjusting a temperature of casing air to be supplied to the high temperature member; and a cooling medium switching unit which switches the cooling medium for the high temperature member from the casing air to the steam, wherein the gas turbine further comprises a processor which compares the steam temperature and the casing air temperature, and which actuates at least one of the water-injecting unit and the air temperature adjusting unit such that the steam temperature and the casing air temperature are equalized based on the comparison result, and a control section which controls at least one of the water-injecting unit and the air temperature adjusting unit based on a signal from the processor, and actuate the cooling medium switching unit to switch the cooling medium to steam when the steam temperature and the casing air temperature are equalized.

According to the above aspect, at least one of the air temperature adjusting unit which adjust a casing air temperature and the water-injecting unit which adjusts a steam temperature, thereby equalizing the casing air temperature and the steam temperature. In this control, the casing air temperature and the steam temperature are used as control parameters, and based on the comparison result, the air adjusting unit and the water-injecting unit are actuated. Here, a temperature difference between the casing air temperature and the steam temperature is within 15° C., preferably within a range of 12 to 13° C., and more preferably within 10°C.

According to the above aspect, as a result of comparison of the casing air temperature and the steam temperature, when the casing air temperature is higher, the casing air temperature is reduced by increasing the cooling amount of the air cooling unit, or by increasing a rate of water to be cooled by the air cooling unit. When the steam temperature is higher, the steam temperature is lowered by increasing the water injection amount in the water-injecting unit or by injecting water of lower temperature.

According to the above aspect, when the steam-temperature is higher, the air cooling unit may be controlled to increase a temperature of the casing air. Since a temperature of the casing air when the cooling medium is switched is about 100° C. higher than the steam temperature, the casing air is cooled and supplied to the high temperature member. Therefore, when the cooling degree is reduced, it is possible to increase the casing air temperature supplied to the high temperature member. With such control, it is possible to swiftly equalize the casing air temperature and the steam temperature. When both the temperatures are equalized, the cooling medium switching unit is actuated, and the cooling medium of the high temperature member is switched to steam. This control apparatus selects the air temperature adjusting unit and the water-injecting unit or uses both the units to control so that the casing air temperature and the steam temperature can be equalized. Therefore, it is possible to equalize both the temperatures without waiting until the steam temperature is brought higher than the casing air temperature and thus, the turbine can proceed the rating operation faster correspondingly, and the starting loss can be reduced.

According to still another aspect of the present invention, there is provided a driving method of a gas turbine which switches a cooling medium which cools a high temperature member of the gas turbine from casing air to steam, the method comprising steps of: measuring temperatures of the casing air and the steam, comparing the temperatures of the casing air and the steam, equalizing the casing air temperature and the steam temperature by adjusting the temperature of the casing air based on the comparison result, and equalizing the casing air temperature and the steam temperature and then, switching the cooling medium of the high temperature member from the casing air to the steam.

According to above aspect, when the casing air temperature and the steam temperature are equalized, both the temperatures are equalized by adjusting the air temperature adjusting unit. Since the casing air temperature when the cooling medium is switched to steam is about 100° C. higher than the steam temperature, the casing air temperature is adjusted by the cooling unit and then is supplied to the moving blade. Since the steam temperature when the cooling medium is switched can not be higher than a certain value, when the steam temperature is lower than the casing air temperature, the casing air temperature and the steam temperature can not be equalized by adjusting the steam temperature. According to this driving method, since the casing air temperature is adjusted, it is possible to equalize the casing air temperature and the steam temperature irrespective of a temperature of steam. Each step in this driving method may be carried out manually. The driving method of this gas turbine can be realized using a computer by a program for allowing the computer to execute the driving method of the gas turbine.

According to above aspect, the driving method of the gas turbine of the present invention comprises a step of measuring the casing air temperature and the steam temperature when the cooling medium which cools the high temperature member of the gas turbine is switched from the casing air to steam, a step of comparing the casing air temperature and the steam temperature with each other, a step of equalizing the casing air temperature and the steam temperature by adjusting the steam temperature based on the comparison result, and a step of switching the cooling medium of the high temperature member from the casing air to steam after the casing air temperature and the steam temperature are equalized.

According to above aspect, both the casing air temperature and the steam temperature are equalized by the water-injecting unit which adjusts the steam temperature when the casing air temperature and the steam temperature are equalized. When water is injected to the steam, the steam temperature can abruptly be lowered and thus, it is possible to control the temperature swiftly. Thus, it is possible to swiftly equalize the casing air temperature and the steam temperature, and to reduce the starting loss. Further, since it is possible to calculate an mount of water to be injected to lower the steam temperature to a certain value from a specific heat or a temperature of steam of water to be injected, it is possible to swiftly control the temperature by injecting water based on this calculation value. With this, since the gas turbine can proceed to the rating operation within a shorter time, the starting loss can further be reduced. Each step in this driving method may be carried out manually. The driving method of this gas turbine can be realized using a computer by a program for allowing the computer to execute the driving method of the gas turbine.

According to still another aspect of the present invention, there is provided a driving method of a gas turbine which switches a cooling medium which cools a high temperature member of the gas turbine from casing air to steam, the method comprising steps of: measuring temperatures of the casing air and the steam; comparing the temperatures of the casing air and the steam; equalizing the casing air temperature and the steam temperature by adjusting at least one of the casing air and the steam based on the comparison result; and equalizing the casing air temperature and the steam temperature and then, switching the cooling medium of the high temperature member from the casing air to the steam.

According to above aspect, when the casing air temperature and the steam temperature are equalized, both the temperatures are equalized by at least one of the air temperature adjusting unit and the water-injecting unit which adjust the steam temperature. According to this driving method of the gas turbine, the air temperature adjusting unit and the water-injecting unit are selected or used to equalize the casing air temperature and the steam temperature. Therefore, even when the steam temperature is lower than the casing air temperature, it is only necessary to adjust the casing air temperature and thus, it is possible to equalize both the temperatures without waiting until the steam temperature becomes higher than the casing air temperature. Therefore, it is possible to shorten a time required to proceed to the rating operation, and the starting loss can be suppressed to a lower value correspondingly. When the casing air temperature and the steam temperature are equalized using both the air temperature adjusting unit and the water-injecting unit, it is possible to equalize both the temperatures further swiftly. Since the gas turbine can proceed to the rating operation within a shorter time, the starting loss can further be reduced. The driving method of this gas turbine can be realized using a computer by a program for allowing the computer to execute the driving method of the gas turbine.

According to still another aspect of the present invention, there is provided a driving method of a gas turbine which switches a cooling medium of a gas turbine moving blade to steam which is already used to cool a high temperature member of the gas turbine such as a stationary blade and the like other than the moving blade, the method comprising steps of: measuring the casing air temperature and the steam temperature, adjusting at least one of the casing air temperature and the steam temperature based on the measurement result, thereby equalizing the temperatures; and equalizing the casing air temperature and the steam temperature and then, switching the cooling medium of the gas turbine moving blade from casing air to steam.

According to the above aspect, steam which is already used to cool a stationary blade which is a high temperature member of the gas turbine is used for cooling a moving blade, and when the cooling medium of the moving blade is switched from the casing air to the steam, the temperatures are equalized and then the cooling medium is switched. Therefore, the shaft vibration of the gas turbine can be suppressed lower than the permissible value and thus, the gas turbine can be operated stably without causing the trip of the gas turbine. Further, since the moving blade is cooled using steam which is already used to cool the stationary blade or the like, it is unnecessary to separately supply cooling steam for the moving blade and the stationary blade. Thus, the cooling steam consumption amount can be reduced to half as compared with the conventional gas turbine.

According to the above aspect, when the warming-up is completed, since a temperature of steam which is already used to cool the stationary blade and a temperature of the casing air are substantially equal to each other, when the cooling medium of the moving blade is switched from the casing air to steam which is already used to cool the stationary blade, it is unnecessary to adjust both the temperatures almost at all. Therefore, it is unnecessary to cool the casing air and to use the air when the moving blade or the turbine main shaft is warmed, energy required for cooling a part can be saved. Further, since the warming up operation can be carried out at a casing air temperature which is higher than the conventional technique, time required between the start and the rating operation of the gas turbine can be shortened correspondingly. With the effect, it is possible to suppress the starting loss of the gas turbine to a lower value than the conventional technique.

According to the above aspect, the casing air temperature and the steam temperature which have been cooled the stationary blade or the like may be adjusted manually. The driving method of this gas turbine can be realized using a computer by a program for allowing the computer to execute the driving method of the gas turbine.

According to the above aspect, the gas turbine combined electric power generation plant of the present invention comprises the gas turbine, an electric generator connected to the gas turbine, an exhaust heat recovery boiler which generates steam by an exhaust gas of the gas turbine, a pipe which supplies steam generated by the exhaust heat recovery boiler to a high temperature member of the gas turbine and which cools the high temperature member, and a steam turbine to which steam generated by the exhaust heat recovery boiler is supplied and which drives the electric generator to generate electric power.

According to the above aspect, this gas turbine combined electric power generation plant include the gas turbine, and when the cooling medium of the high temperature member is to be switched, it is switched after the casing air temperature and the steam temperature are equalized. Therefore, danger of trip of the gas turbine caused by the shaft vibration of the entire rotor system can be minimized. Therefore, the electric power can be supplied on schedule, and the plant can be operated reliably. Further, since the cooling medium can be switched swiftly, the starting loss can also be reduced.

According to the above aspect, this gas turbine combined electric power generation plant includes the gas turbine, and steam which is already used to cool the stationary blade or the like of the gas turbine is used for cooling the moving blade. Therefore, it is unnecessary to separately supply cooling steam for the moving blade and the stationary blade. Thus, the cooling steam consumption amount can be reduced to half as compared with the conventional gas turbine. Further, the cooling medium of the moving blade is switched from the casing air to the steam which is already used to cool the stationary blade without adjusting the temperatures almost at all. Therefore, when the moving blade or the turbine main shaft is warmed, it is unnecessary to cool the casing air. Thus, energy required for cooling the casing air can be saved. Further, since it is unnecessary to cool the casing air, the moving blade can be warmed up with a higher temperature, and time required between the start and the rating operation of the plant can be shortened correspondingly. With the effect, it is possible to suppress the starting loss of the electric power generating plant and thus, increase thermal economy.

Other objects and features of this invention will become understood from the following explanation with reference to the accompanying drawings.

DETAILED DESCRIPTION

The present invention will be explained below with reference to the drawings. The invention is not limited to embodiments. Constituent elements that a person skilled in the art can easily achieve are included in the embodiments.
(First Embodiment)

Figure 1:
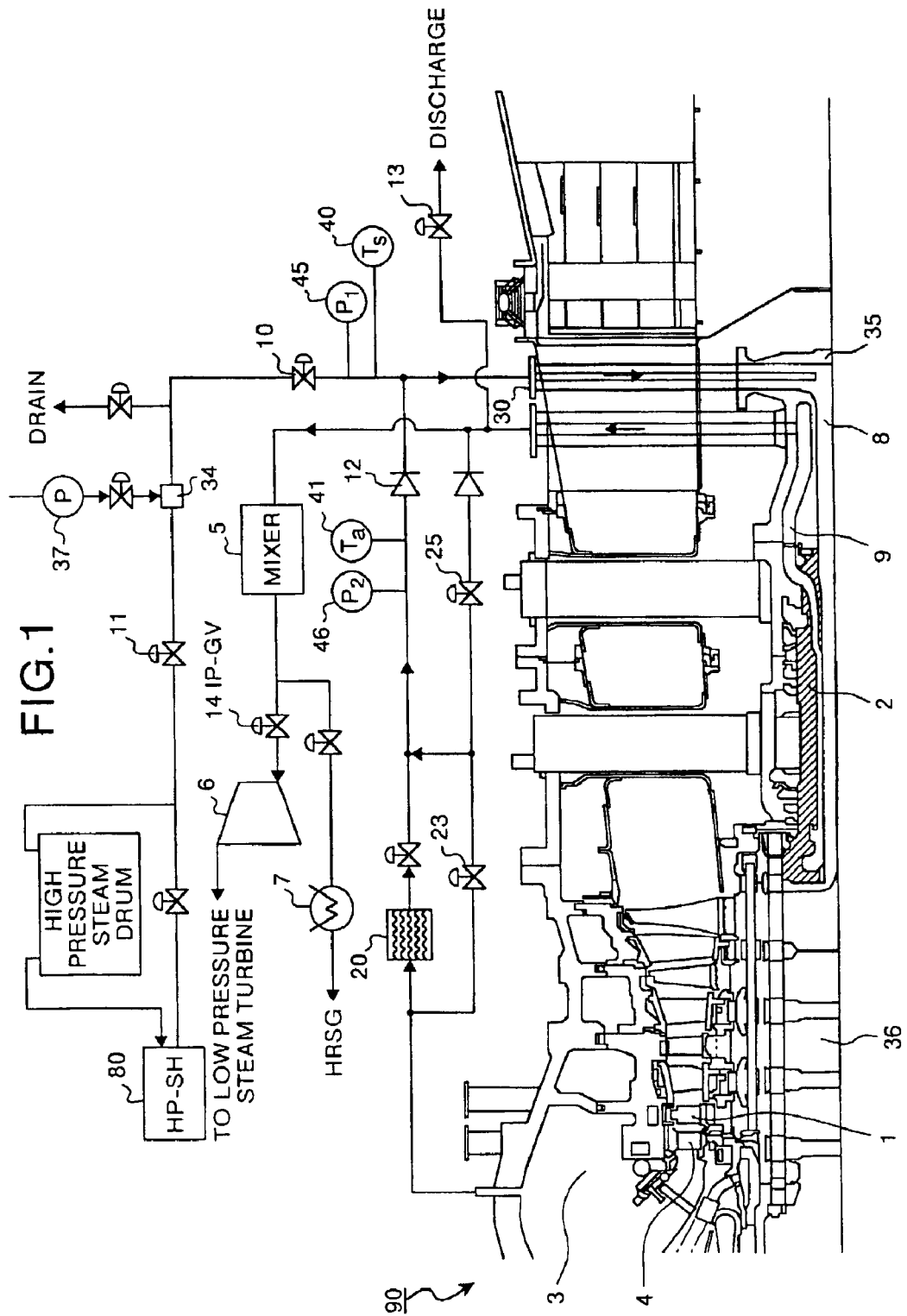
FIG. 1 is an explanatory diagram which shows a gas turbine and its cooling system according to a first embodiment of this invention.

FIG. 1 is an explanatory diagram which shows a gas turbine using a steam cooling and a cooling system according to a first embodiment of the present invention. This gas turbine warms up a moving blade and the like by means of air supplied from a casing until a warming up operation of the moving blade and the like from activation of the gas turbine is completed. After completion of the warming up operation, a temperature of cooling air supplied from the casing and a temperature of steam supplied from outside of the gas turbine are equalized, and the cooling medium is switched to steam. In the following explanation, a case such that a cooling medium of the moving blade is switched from air to steam will be explained, but the scope of the present invention is not limited to the moving blade. For example, a case such that the cooling medium of a stationary blade is switched from auxiliary steam formed by a boiler in a factory into high pressure steam formed by a high pressure superheater is also included in a scope of the present invention. The invention can also be applied to a case such that cooling steam of a combustion receiver is switched to high pressure steam of HRSG from the factory auxiliary steam.

An electric generator (not shown) connected to a gas turbine 90 is used as a motor, and the gas turbine 90 is actuated. When the gas turbine 90 is actuated, the rotation of the gas turbine 90 is increased until a constant rotation number (here, 3600 rpm) is achieved. Here, immediately after the gas turbine 90 is actuated, the HRSG (not shown) having great thermal capacity can not sufficiently supply steam yet. Therefore, in order to cool the moving blade 1 of the gas turbine 90, casing air supplied from a casing 3 of the gas turbine 90 is used. This casing air is allowed to flow through a moving blade 1, a turbine main shaft 2 and the like to warm them until metal temperatures thereof become equal to or higher than a saturated temperature of the cooling steam supplied thereafter. When the metal temperature of the moving blade 1, the turbine main shaft 2 or the like is lower than the saturated temperature of the cooling steam, the steam is condensed after the cooling medium is switched to the cooling steam, which causes inconvenience in a rotation system. The saturated temperature of the cooling steam differs depending upon a driving condition and specification of the gas turbine, but the warming up operation is carried out until the metal temperature of the moving blade 1 and the like becomes 250° C. or higher.

A temperature of the casing air supplied from the casing 3 is 400 to 450° C. whereas, the metal temperature of the moving blade 1, the turbine main shaft 2 and the like at the time of cold start of the gas turbine 90 is 150 to 250° C. Therefore, when the casing air is supplied to the moving blade 1 as it is, a temperature difference of about 300° C. at the maximum is generated between the casing air temperature and the metal temperature of the moving blade 1 and the like. Thus, the moving blade 1 and the turbine main shaft 2 are abruptly expanded by the temperature difference, and excessive thermal stress is abruptly applied to the moving blade 1 and the like, and there is an adverse possibility that deformation and destroy are caused. Further, since the moving blade 1 and the turbine main shaft 2 rotate at high speed, even when there is a slight deformation, the rotation balance largely comes undone and trip (stop of the gas turbine 90 is caused sometimes.

On the other hand, the metal temperature of the moving blade 1 or the turbine main shaft 2 becomes higher than the casing air temperature at the time of hot start sometimes. In this case, the moving blade 1 is shrunk, but the casing air does not always uniformly cool the moving blade 1 and the turbine main shaft 2 due to working precision of a cooling flow passage of the moving blade 1 and the turbine main shaft 2 or pressure distribution in the turbine. Therefore, the temperature distribution is generated in the moving blade 1 or the turbine main shaft 2 and as a result, a size is partially deformed, the rotation balance comes undone, and the trip of the gas turbine 90 is caused.

Figure 2A:
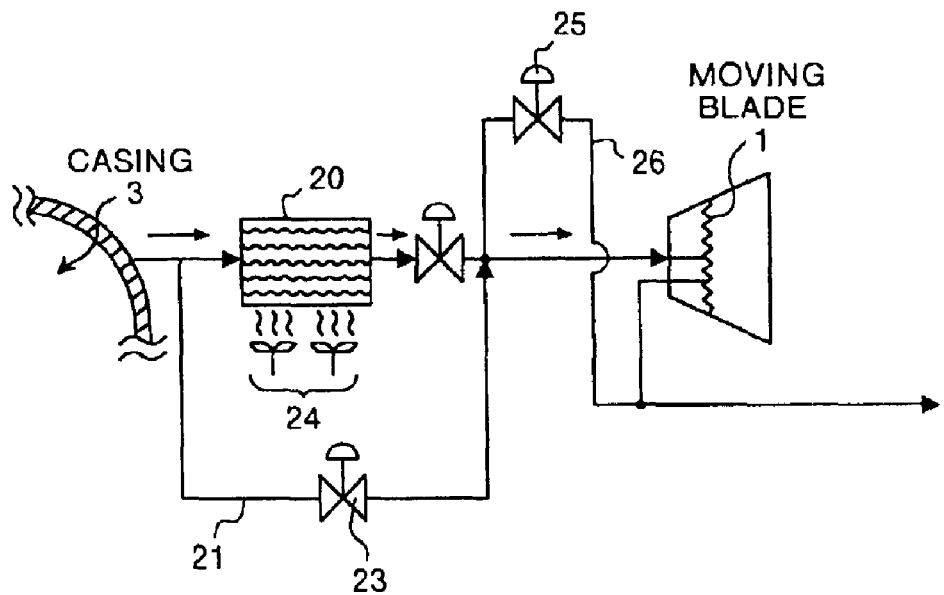
FIG. 2 is an explanatory diagram which shows a casing air supply system.
Figure 2B:
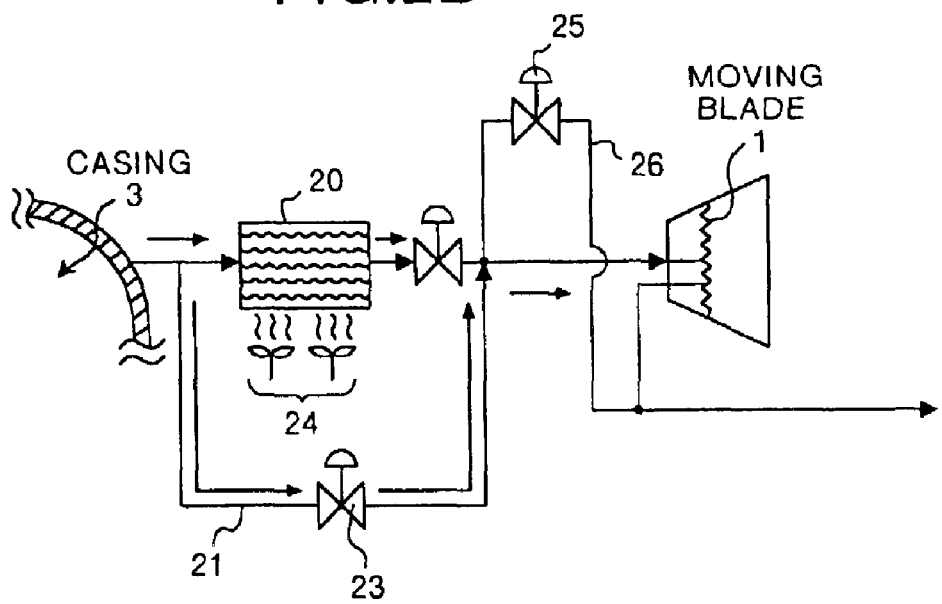

To avoid such problems, the casing air steam is constituted as shown in FIG. 2. Here, FIG. 2 is an explanatory diagram which shows the casing air supply system. The casing air supply system includes a TCA (Turbine Cooling Air) cooler 20, and a bypass flow passage 21 bypassing the TCA cooler 20. The bypass flow passage 21 is provided with a flow-rate adjusting valve 23 which adjust the flow rate of casing air bypassing the TCA cooler 20. At the time of cold start (FIG. 2A), the flow-rate adjusting valve 23 is closed, all a temperature of the casing air is reduced to about a metal temperature of the moving blade 1 and then is supplied to the moving blade 1 or the like. The TCA cooler 20 includes a cooling fan 24. By adjusting the number of cooling fans 24 and the number of rotation thereof, it is possible to adjust a temperature of the casing air passing through the TCA cooler 20. In this manner, a metal temperature of the moving blade 1 is gradually increased to a saturated temperature of steam or higher supplied next.

At the time of hot start (FIG. 2B), since the metal temperature of the moving blade 1 or the like is increased to some degree, it is unnecessary to largely reduce a temperature of the casing air. Therefore, an amount of casing air bypassing the TCA cooler 20 is increased by opening the flow-rate adjusting valve 23. A temperature of the casing air supplied to the moving blade 1 or the like is not lowered excessively and then, the casing air is supplied to the moving blade 1 or the like. It is also possible to adjust a temperature of the casing air by adjusting the number of cooling fans 24 or the number of rotation thereof. Casing air having optimal temperature can be supplied irrespective of the cold start or hot start by such the casing air cooling system. Thus, thermal deformation of a rotation system such as the moving blade 1, the turbine main shaft 2 (see FIG. 1) and the like can remarkably be reduced. With this, since the trip of the gas turbine 90 (see FIG. 1) can be suppressed, the gas turbine can be driven stably.

When the flow rate of casing air flowing through the moving blade 1 or the like is too small, the cooling effect becomes insufficient, a temperature of metal exceeds the permissible value, and the moving blade 1 or the like is damaged sometimes. On the other hand, when the metal temperature of the moving blade 1 is too low, when the amount of casing air supplied to the moving blade 1 is too much, a long time is required until the metal temperature is increased to an appropriate temperature and as a result, the starting loss is increased sometimes. Therefore, after the bypass flow passage 21 merge with a passage downstream of the TCA cooler 20, a turbine bypass flow passage 26 which allows the moving blade 1 to bypass is provided, and the casing air amount supplied to the moving blade 1 may be adjusted to an appropriate amount by the flow-rate adjusting valve 25. With this, an appropriate casing air can flow through the moving blade 1 and thus, the metal temperature of the moving blade 1 or the like can be increased swiftly while suppressing the starting loss.

When a temperature of the moving blade 1, the turbine main shaft 2 or the like becomes higher than a saturated temperature of steam supplied after the cooling medium is switched, medium which cools the moving blade 1 or the like is switched to high pressure steam of an HP-SH (High Pressure-Super Heater: high pressure superheater) 80. First, a HP-SH pressure adjusting valve 11 is controlled, and a pressure of the high pressure steam supplied from the HP-SH 80 is controlled to about 2 MPa. This is because that the casing air pressure is about 2 MPa, and a pressure difference between the both is reduced, thereby switching the cooling medium as smooth as possible.

However, when a pressure of the casing air is higher than that of steam supplied to the moving blade 1 or the like, high temperature combustion gas reversely flows from a film cooling air hole (not shown) provided in a surface of the moving blade 1. As a result, the moving blade 1 is heated and there is an adverse possibility that a trip of the gas turbine is caused. Therefore, it is necessary to keep the pressure of steam supplied to the moving blade 1 or the like higher than that of the casing air.

Therefore, a steam pressure $P_1$ supplied to the moving blade by a pressure gage 45 is controlled such that a pressure $P_2$ of the casing air is measured by a pressure gage 46 and a relation $P1>P_2+\alpha$ is always kept. The reason why $\alpha$ is added is that even when the casing air pressure $P_2$ is abruptly increased by some reason, $\alpha$ becomes a margin and it is possible to increase the P1 before the $P_2$ exceeds P1. Although this $\alpha$ slightly differs depending upon specifications of the gas turbines, when the $\alpha$ is in a range of 0.15 to 0.20 MPa, even when the casing air pressure $P_2$ is abruptly increased by some reason, control of pressure can follow the increase. Concerning the control of the steam pressure $P_1$ supplied to the moving blade 1, the P1 can be increased by closing the exhaust valve 13 or opening the HP-SH pressure adjusting valve 11 for example.

When a pressure of the high pressure steam supplied from the HP-SH 80 becomes about 2 MPa by controlling the HP-SH pressure adjusting valve 11, the moving blade steam control valve 10 provided on the moving blade 1 closer to its inlet is gradually opened. Then, the steam pressure $P_1$ downstream of the moving blade steam control valve 10 gradually starts increasing. A casing air check valve 12 is provided upstream of the casing air supply system having a reference portion where the casing air supply system merges with the steam supply system. When the steam pressure $P_1$ becomes higher than the casing air pressure P2, the casing air check valve 12 is closed. Thus, the cooling medium supplied to the moving blade 1 is switched from the casing air to the steam.

When the cooling medium of the moving blade 1 is switched to steam, the exhaust valve 13 provided on the cooling flow passage of the moving blade 1 closer to its outlet is closed, and the steam which is already used to cool the moving blade 1 is introduced to the mixer 5. The steam introduced to the mixer 5 is mixed with steam which is already used to cool the cover (not shown) or the stationary blade 4 and drives an intermediate pressure turbine 6. The exhaust valve 13 is opened before the cooling medium of the moving blade 1 is switched to steam, and the casing air is discharged outside the gas turbine from the outlet of the cooling flow passage of the moving blade 1. The steam which drove the intermediate pressure turbine 6 is introduced into a steam condenser 7 and returned to water, and is again supplied to the HRSG.

When steam formed by the HRSG as a cooling medium for the moving blade 1 is used, it is necessary to convert thermal energy of exhaust gas of the gas turbine recovered by the GRSG into kinetic energy by the intermediate pressure turbine 6 and taken out outside. Therefore, the exhaust valve 13 is closed, and the intermediate pressure turbine 6 is driven by steam which is already used to coolthe moving blade 1. Here, since heat of the steam introduced into the moving blade 1 is exchanged by the cooling flow passage provided in the moving blade 1, a temperature of steam after cooling becomes higher than that before cooling. Therefore, since thermal energy of the increased temperature of the steam after the intermediate pressure turbine 6 also recovers cooling, the thermal efficiency of the entire plant is enhanced.

When the cooling medium is switched, it is necessary to equalize a temperature of the casing air and a temperature of the high pressure steam from the HP-SH 80. The reason is as follows. That is, as shown in FIG. 1, a steam supply pipe 8 which supplies steam to the moving blade 1 and steam recovery pipes 9 which recover steam after cooling the moving blade 1 are provided in the turbine main shaft 2. Although it is not apparent from FIG. 1, the steam recovery pipes 9 are annularly provided between the turbine main shaft 2 and the steam supply pipe 8.

The high pressure steam supplied outside of the gas turbine 90 is introduced into the turbine main shaft 2 from a cooling medium supply port 30. Here, due to disposing reason of the pipe system, steam is supplied in a direction perpendicular to an axial direction of the turbine main shaft 2 and then, the steam turns at a joint portion 35 at an angle of 90° and flows into the steam supply pipe 8 in the turbine main shaft 2. In this manner, the high pressure steam supplied from the HP-SH 80 abruptly changes its flowing direction at the joint portion 35 before being introduced into the steam supply pipe 8 in the turbine main shaft 2. Therefore, the flow of the steam in the steam supply pipe 8 provided in that the turbine main shaft 2 is disordered.

A plurality of moving blades 1 are mounted around a rotor disk 36 to form one turbine cascade of blades, but cooling flow passages respectively formed in the moving blades 1 are not completely uniformly formed. Because the forming precision of the cooling flow passages provided in the moving blades 1 differs, pressure losses in the cooling flow passages are different. As a result, the amounts of cooling medium flowing in the cooling flow passages are also different. Therefore, steam does not flow uniformly to all of the steam recovery pipes 9 provided in the turbine main shaft 2 and thus, the flow rate of steam differs depending upon pipes.

When a cooling medium of the moving blade 1 is switched from casing air to high pressure steam of the HP-SH 80, both the casing air and steam are mixed sometimes. Here, the flow in the steam supply pipe 8 is disordered and cooling medium does not flow equally to all of the steam recovery pipes 9. Therefore, when the cooling medium is switched, a portion where the casing air is included more and a portion where the high pressure steam is included more exist. And when a temperature difference therebetween becomes great, a temperature distribution of the steam supply pipe 8 and the steam recovery pipes 9 is remarkably generated and as a result, a temperature distribution is generated also in the moving blade 1, the turbine main shaft 2 or the rotor disk 36.

Figure 3A:
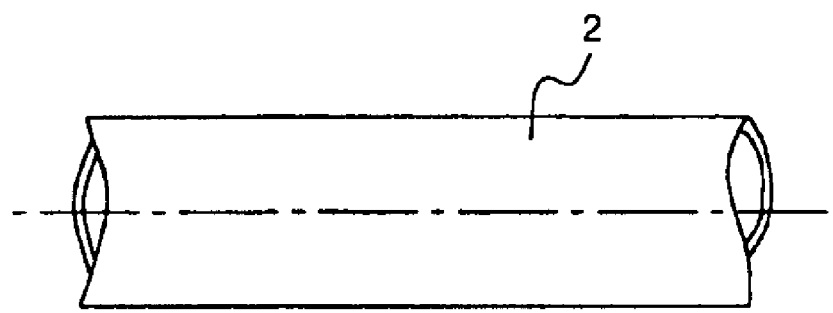
FIG. 3 is a schematic diagram which shows a case such that a temperature distribution in a circumferential direction is generated in a turbine main shaft.
Figure 3B:
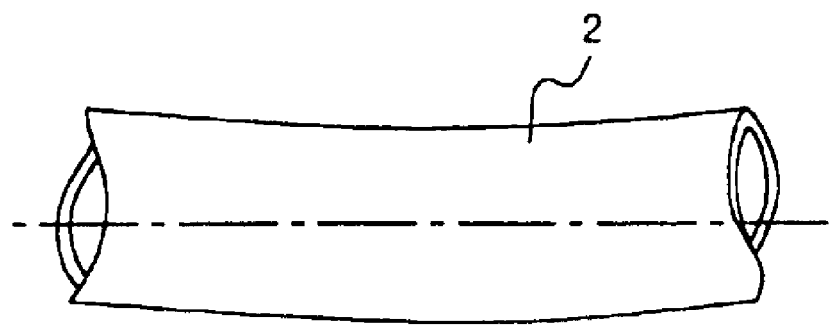

FIG. 3 is a schematic diagram which shows a case such that a temperature distribution in a circumferential direction is generated in the turbine main shaft 2. Here, FIG. 3A shows a case such that the temperature distribution in the circumferential direction is small, and FIG. 3B shows a case such that the temperature distribution in the circumferential direction is great. Especially when a temperature difference is generated in the circumferential direction of the turbine main shaft 2, the turbine main shaft 2 is warped as shown in FIG. 3B. Since the turbine main shaft 2 is warped greater as the temperature difference in the circumferential direction becomes greater, the shaft vibration becomes greater and the trip of the gas turbine 90 is finally generated. That is, when a temperature distribution in the circumferential direction is generated in the turbine main shaft 2 and the temperature difference becomes greater, shaft vibration generated in the turbine main shaft 2 is also increased.

Figure 4:
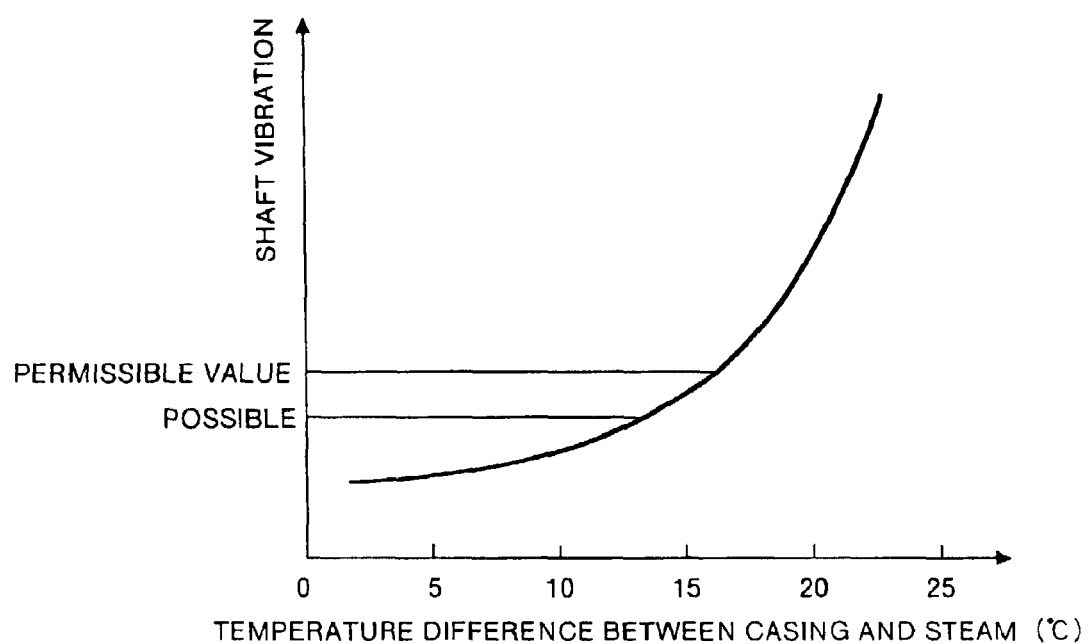
FIG. 4 is an explanatory diagram which shows a relation between a shaft vibration of the turbine main shaft and a temperature difference between casing air and high pressure steam.

FIG. 4 is an explanatory diagram which shows a relation between a shaft vibration of the turbine main shaft and a temperature difference between casing air and high pressure steam. Here, the shaft vibration is a deflection width from a center axis. It is found as shown in FIG. 4 that when a temperature difference therebetween becomes smaller, a value of the shaft vibration also becomes smaller. The value of the shaft vibration when the temperature difference therebetween exceeds 20° C. exceeds a permissible value of operation, and with this value of shaft vibration, a trip of the gas turbine is generated. When the temperature difference therebetween is equal to or lower than 15° C., the shaft vibration assumes a value which is permissible for operating the gas turbine, but since this value is close to a tolerance limit, when the gas turbine is operated with this temperature difference, the operation state of the gas turbine becomes slightly unstable. In order to operate the gas turbine more stably, it is preferable to set the temperature difference therebetween to 12 to 13° C., and more preferably 10° C. or lower.

A method for equalizing a temperature of casing air and a temperature of high pressure steam will be explained. The temperatures of the air and steam can be equalized by adjusting at least one of the temperatures of the casing air and the high pressure steam. As shown in FIG. 1, a water injecting spray 34 is provided between the moving blade 1 and the HP-SH 80 for injecting water to the high pressure steam to lower a temperature of the high pressure steam. A high pressure water supply pump 37 is connected to the water injecting spray 34, and water is injected to the high pressure steam supplied from the HP-SH 80.

Water injected to the high pressure steam becomes particulates, the particulates are dispersed into the high pressure steam and thus, a temperature of the high pressure steam can swiftly be lowered. Thus, it is possible to swiftly equalize the temperatures of the steam and the casing air. It is possible to adjust the temperature of the casing air by changing an amount of air to be cooled by the TCA cooler 20 (see FIG. 2), by changing the number of cooling fans 24 to be operated, or by changing the number of rotation of the cooling fan 24.

When the temperature of the casing air is higher than that of the steam, the amount of casing air passing through the TCA cooler 20 (see FIG. 2) is increased to warm the pipe of the steam and the temperature of the steam is increased. The casing air temperature may be adjusted by reducing the number of fans of the TCA cooler 20 or by reducing the number of rotation of the fan of the TCA cooler 20. When the temperature difference therebetween becomes 10° C. or lower, the cooling medium is switched from the casing air to the high pressure steam. When the steam temperature is higher the casing air temperature, cooling water is injected to the high pressure steam by the water injecting spray 34 (see FIG. 1) to lower the steam temperature, and the casing air amount passing through the TCA cooler 20 (see FIG. 2) is reduced to increase the casing air temperature. Then, when the temperature difference between the casing air and the steam becomes 10° C. or less, the cooling medium is switched to steam.

Since both the temperatures can be equalized within a short time by simultaneously adjusting the casing air temperature and the steam temperature in this manner, a long time is not required for switching the cooling medium, and the starting loss can be reduced. Both the temperatures may be equalized by adjusting a temperature of at one of the casing air and the high pressure steam. In this case, although a time for equalizing both the temperatures is increased, both the temperatures abruptly approach each other and as a result, it is possible to suppress a danger that both the temperatures exceed a predetermined range.

Figure 5A:
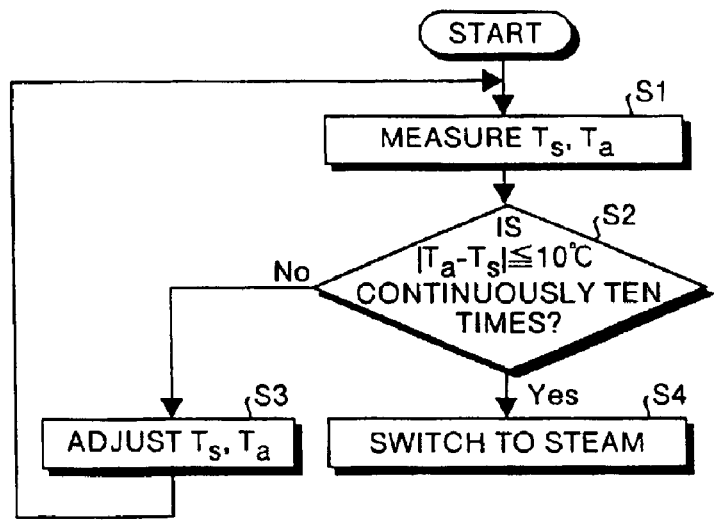
FIGS. 5A and 5B are explanatory diagrams which show a control method for equalizing a casing air temperature and a steam temperature.
Figure 5B:
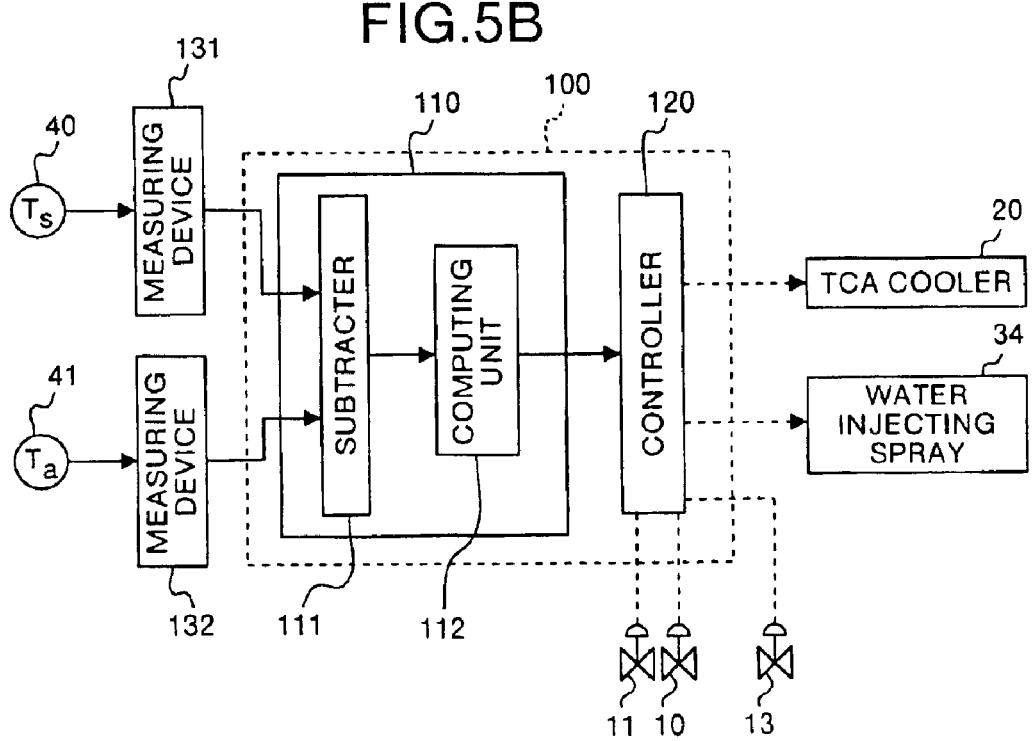

FIG. 5 are explanatory diagrams which show a control method for equalizing a casing air temperature and a steam temperature. Here, FIG. 5A is a flowchart which shows the control method, and FIG. 5B is a block diagram which shows a control apparatus. According to this control method, when an absolute value of a difference between a steam temperature and a casing air temperature becomes a value within a predetermined temperature (here, 10° C.), the cooling medium is switched to steam. As shown in FIG. 1, a steam temperature Ts is measured by a thermometer 40, and a casing air temperature Ta is measured by a thermometer 41. The thermometers 40 and 41 are provided in the vicinity of the cooling medium supply port 30 provided in the gas turbine 90. When the temperatures are measured at these portions, it is sufficient to control the temperature. In order to control more precisely, the temperature may be measured at a position closer to the moving blade 1.

The thermometers 40 and 41 (step S1) measure the steam temperature Ts and the casing air temperature Ta. The result of the measurements are respectively sent to measuring devices 131 and 132 and converted into electric signals. The electric signals are A/D converted in the measuring devices 131 and 132 and then, are sent to a control apparatus 100. A difference therebetween is calculated using a subtracter 111 included in a processor 110 in the control apparatus 100 as a comparing unit. A comparator may be used in addition to the subtracter as the comparing unit, and based on the result, a difference between the steam temperature Ts and the casing air temperature Ta may be calculated using an arithmetical unit.

The A/D converted signal is taken into the subtracter 111 at sampling frequency 500 ms. The sampling frequency is a value appropriately set in view of responding speed of control or the like, and it is not limited to 500 ms. When an absolute value $\Delta T$ of this difference=|Ta−Ts| falls within 10° C. predetermined times continuously (here, ten times), a control signal is sent to a controller 120 which is a control section from a computing unit 112 (step S2). Then, the moving blade steam control valve 10, the pressure adjusting valve 11 and the exhaust valve 13 are controlled, and the cooling medium is switched to steam (step S4).

When control is made under environment where noise is prone to be generated in a signal, the $\Delta t$ does not fall within 10° C. continuously due to influence of the noise sometimes. In such a case, when ten $\Delta t$ obtained based on temperature measured at certain sampling cycle are averaged, and when the average value falls within 10° C., the cooling medium may be switched. In this method, since the influence of noise can be eliminated, it is unnecessary to adjust the temperature for unnecessarily long time, and the cooling medium can be switched. Although two methods are explained for judging whether $\Delta t$ falls within 10° C., the judgement whether a temperature difference between the steam temperature Ts and the casing air temperature Ta falls within 10° C. is not limited to these two methods. For example, using a temperature of the turbine main shaft 2 (see FIG. 1), both the temperatures may be set within a range of this temperature ±5° C.

When the absolute value $\Delta t$ of the difference does not fall within 10° C., a control signal is sent from the computing unit 112 to the controller 120. The TCA cooler 20 or the water injecting apparatus high pressure water supply pump 37 is operated by the controller 120 to control such that the $\Delta t$ falls within 10° C. (step S3). At that time, it is possible to calculate how much air should bypass or how much water should be injected from a specific heat of casing air or cooling steam. Therefore, when this calculated value is used together with feedback of the temperature, it is possible to bring the $\Delta t$ within a predetermined temperature more quickly. The TCA cooler 20 and the water injecting apparatus high pressure water supply pump 37 may be operated at the same time, or only one of them is operated to bring the $\Delta t$ within 10° C.

In order to increase the steam temperature, it is necessary to increase the thermal energy input to the HRSG, but since the HRSG has great thermal capacity, it is difficult to increase the steam temperature within a short time. Therefore, when the cooling air temperature Ta higher than the steam temperature Ts, a temperature of air passing through the TCA cooler 20 is increase to lower a temperature of cooling air so that Δt becomes within 10° C. On the other hand, when the casing air temperature Ta is higher than the steam temperature Ts, water is injected to steam to lower the steam temperature Ts, and an amount of cooling air passing through the TCA cooler 20 is reduced to increase the casing air temperature Ta. With this method, since the casing air temperature Ta and steam temperature Ts approach each other, the Δt can be within 10° C. within a shorter time.

Figure 6A:
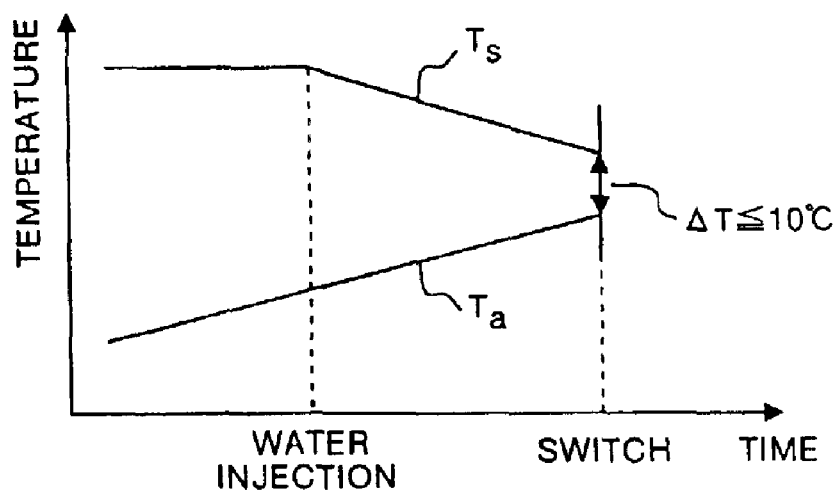
FIGS. 6A and 6B are explanatory diagrams which show a variation of the casing air temperature and the steam temperature.

When the steam temperature Ts is higher than the casing air temperature Ta, as shown in FIG. 6A, based on a rate of change between the casing air temperature Ta and the steam temperature Ts, one of them having smaller absolute value of the rate of change may be controlled such that it is largely changed. For example, in FIG. 6, since an absolute value of rate of change of the casing air temperature Ta is smaller, the amount of water to be injected is increased to abruptly lower the steam temperature Ts. With this, since the steam temperature Ts is abruptly lowered, it is possible to contain the Δt within 10° C. in a shorter time.

Figure 6B:
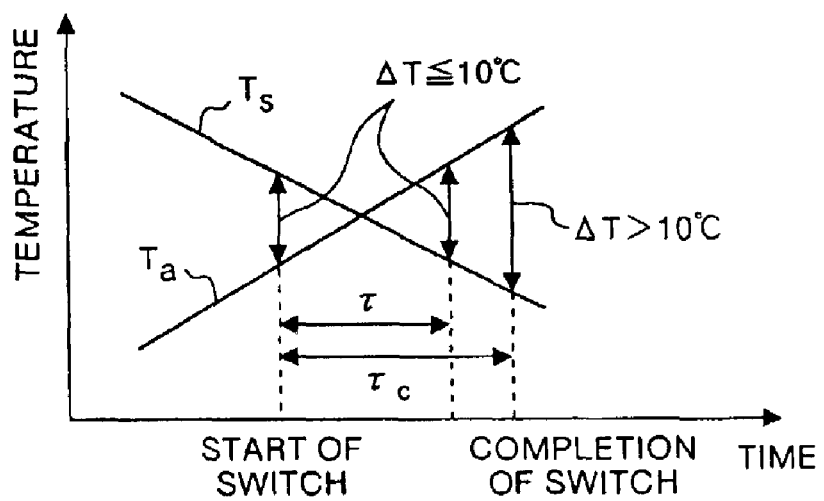

When the cooling medium is switched from the casing air to steam, it is necessary to adjust a pressure of the steam, and it is also necessary gradually open the moving blade steam control valve 10 (see FIG. 1) and thus a certain time is required. Therefore, as shown in FIG. 6B, when the rate of change of the steam temperature Ts and the cooling air temperature Ta is great, both of them are reversed and the Δt exceeds 10° C. before time τc from a time point when the switch of the cooling medium is started to a time point when the switch is completed is elapsed sometimes. In such a case, there is an adverse possibility that shaft vibration is generated to cause the trip of the gas turbine.

To prevent this, time τ during which both of them are reversed and Δt exceeds 10° C. is obtained from the rate of change of the cooling air temperature Ta and the steam temperature Ts, and when τ is shorter than switching time τc of the cooling medium, the rate of change of the steam temperature Ts or the like is made smooth. More specifically, there is a method in which the water injecting amount is reduced, or a cooling air amount passing through the TCA cooler is increased. With such a method, since Δt does not exceed 10° C. from a time point when the switching of the cooling medium is started to a time point when switching of the cooling medium is completed, it is possible to suppress the shaft vibration lower than the permissible value, and to suppress the trip of the gas turbine.

The processor 110 may be a section realized by a special hardware, or may be a section constituted by a memory and a CPU (Central Arithmetical Unit) and in which a program (not shown) for realizing function of the processor 110 is loaded in the memory to execute the same. Further, the control apparatus 100 may be an apparatus in which an input device, a display device and the like (not shown) are loaded to a memory to execute the same, thereby realizing the function.

(Second Embodiment)

FIG. 7 is a partial sectional view which shows a gas turbine according to a second embodiment of the invention. The second embodiment is such that this gas turbine includes a manifold for stagnating the cooling medium immediately upstream of a pipe entering the turbine main shaft 2 which supplies the cooling medium to the moving blade, this manifold stagnates the cooling medium and then, the cooling medium is supplied to a cooling medium supplying pipe provided in the turbine main shaft 2.

As described above, the reason whey the trip of the gas turbine is generated when the cooling medium of the moving blade is switched from the casing air to the high pressure steam is that thermal expansion is generated by a temperature difference generated in a rotation system of the gas turbine such as the moving blade, the turbine main shaft and the rotor disk. Especially when a temperature distribution in the circumferential direction is generated in the turbine main shaft 2, the turbine main shaft 2 is warped (see FIG. 3), this causes the shaft vibration and the trip of the gas turbine.

Figure 7A:
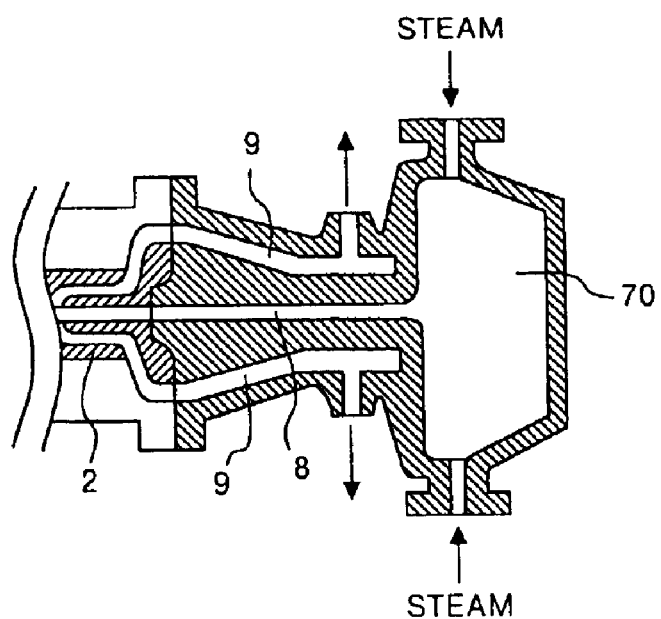
FIGS. 7A and 7B are partial sectional views which show a gas turbine according to a second embodiment of the invention.

One of factor causing the temperature distribution in the turbine main shaft 2 is that steam which is the cooling medium unevenly flows into the steam supply pipe 8 or the steam recovery pipe 9 (see FIG. 1) provided in the turbine main shaft 2. As shown in FIG. 7A, in the gas turbine of the third embodiment, the steam which is the cooling medium is stagnated by a manifold 70 provided at upstream of the steam supply pipe 8. The steam flows into the steam supply pipe 8 such that substantially uniform speed distribution can be obtained in a cross section perpendicular to the axial direction. Therefore, temperature distribution in the circumferential direction is not generated almost at all in the turbine main shaft 2 and thus, warp of the turbine main shaft 2 due to a great temperature distribution is not generated almost at all. As a result, since the shaft vibration of the turbine main shaft 2 is suppressed lower than the permissible value, the trip of gas turbine is not generated almost at all.

Figure 7B:
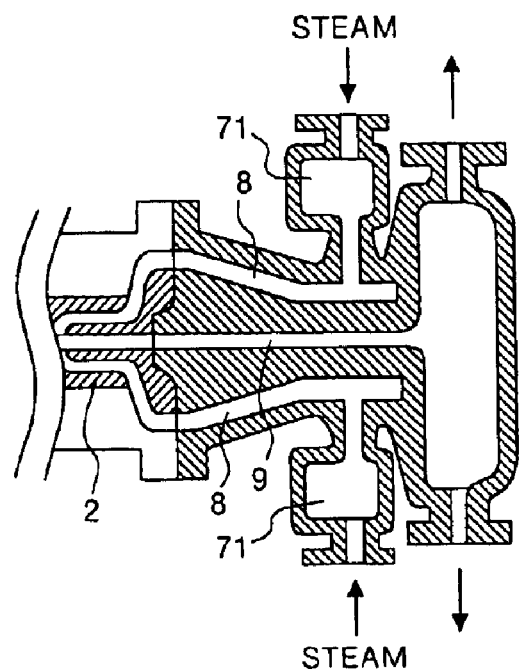

As shown in FIG. 7B, the steam supply pipe 8 maybe provided outside the steam recovery pipe 9. In this case, a manifold 71 is provided around the steam supply pipe 8 to supply steam. Then, after the manifold 71 stagnates the steam, steam is supplied to steam supply pipes 8. With this, steam flows substantially uniformly into all the steam supply pipes 8 and thus, substantially uniform temperature distribution in the circumferential direction can be obtained in the turbine main shaft 2. Therefore, warp of the turbine main shaft 2 due to the temperature distribution generated in the turbine main shaft 2 is not generated almost at all. As a result, the shaft vibration of the turbine main shaft 2 is suppressed lower than the permissible value, and the trip of the gas turbine is not generated almost at all.

(Modification 1)

Figure 8:
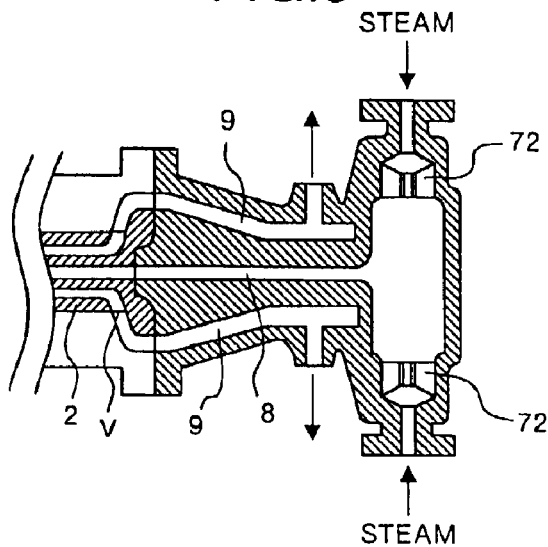
FIG. 8 is a partial sectional view which shows a first modification of the gas turbine of the second embodiment of the invention.

FIG. 8 is a partial sectional view which shows a first modification of the gas turbine of the second embodiment of the invention. This gas turbine is such that a swirler 72 which stirs the cooling medium is provided at upstream of the cooling medium supply pipe which supplies the cooling medium to the moving blade, thereby making a temperature of the cooling medium uniform. Another reason why the temperature distribution is generated in the turbine main shaft 2 is that a temperature of the steam which is the cooling medium differs depending upon a position. In this modification, before the steam flows into the steam supply pipe 8 which is the cooling medium supply pipe provided in the turbine main shaft 2, the steam is sufficiently stirred by the swirler 72 to make the temperature distribution uniform as complete as possible. With this method, a temperature of steam flowing into the steam supply pipe 8 is almost uniform, and the steam flows into the steam supply pipe 8 and thus, the temperature distribution in the circumferential direction of the turbine main shaft 2 is not generated almost at all. As a result, it is possible to suppress the shaft vibration lower than the permissible value and to suppress the trip of the gas turbine.

(Modification 2)

Figure 9A:
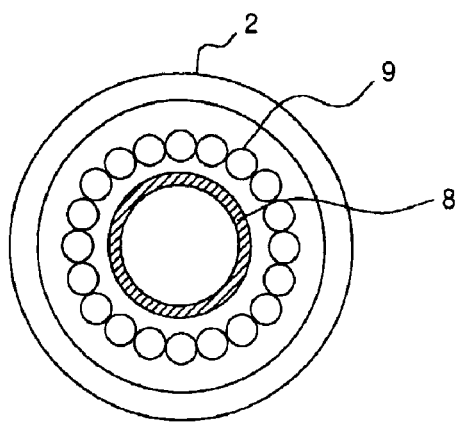
FIGS. 9A and 9B are sectional view which show a second modification of the gas turbine of the second embodiment of the invention which is perpendicular to an axial direction thereof.
Figure 9B:
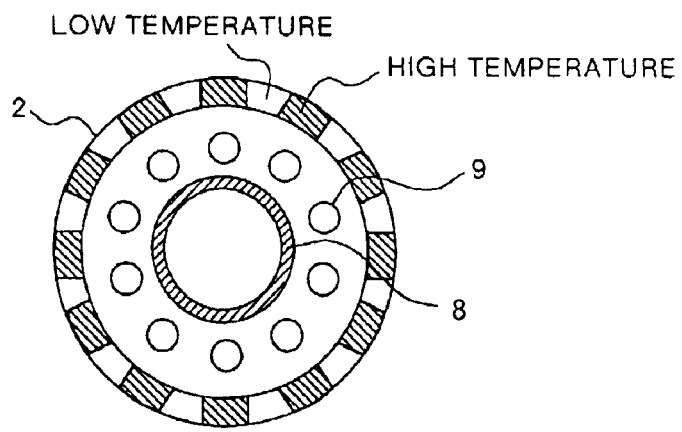

FIG. 9 is a sectional view which shows a second modification of the gas turbine of the second embodiment of the invention which is perpendicular to an axial direction thereof. This gas turbine is such that the number of steam recovery pipes 9 which recovers steam which is already used to cool the moving blade is increased, and the temperature distribution in the circumferential direction of the turbine main shaft is made more uniform. Conventionally, the number of steam recovery pipes 9 provided in the turbine main shaft 2 is 8 to 12. Therefore, as shown in FIG. 9B, 8 to 12 high temperature portions and 8 to 12 low temperature portions are generated in the turbine main shaft 2. Therefore, when the flow rate of steam flowing through the respective steam recovery pipes 9 is different, the temperature distribution is relatively prone to be generated in an axial direction of the turbine main shaft 2. Thereupon, as shown in FIG. 9A, the number of steam recovery pipes 9 of the gas turbine of this modification is increased. Thus, even when the flow rate of steam flowing through the steam recovery pipes 9 is different, the temperature distribution in the circumferential direction of the turbine main shaft 2 is prone to be uniform. As a result, shaft vibration of the entire rotor system including the turbine main shaft 2 and the rotor disk can be suppressed lower than the permissible value, and the gas turbine can be operated.

It is possible to select any of the three kinds of units, i.e., increase in the number of manifolds, the swirlers and cooling medium supply pipes, in accordance with specification of the gas turbine, or the units can be combined. Especially when the two or more of the three units are combined and used, it is effective because the temperature distribution in the circumferential direction of the turbine main shaft can be made uniform. Further, when the cooling medium of the moving blade is switched as explained in the first embodiment, a method for equalizing temperatures of the casing air and steam may also be used. When this method is used, since the temperature distribution in the circumferential direction of the turbine main shaft can be made uniform, the tip of the gas turbine can further be suppressed, and the gas turbine can be operated stably.

(Third Embodiment)

Figure 10:
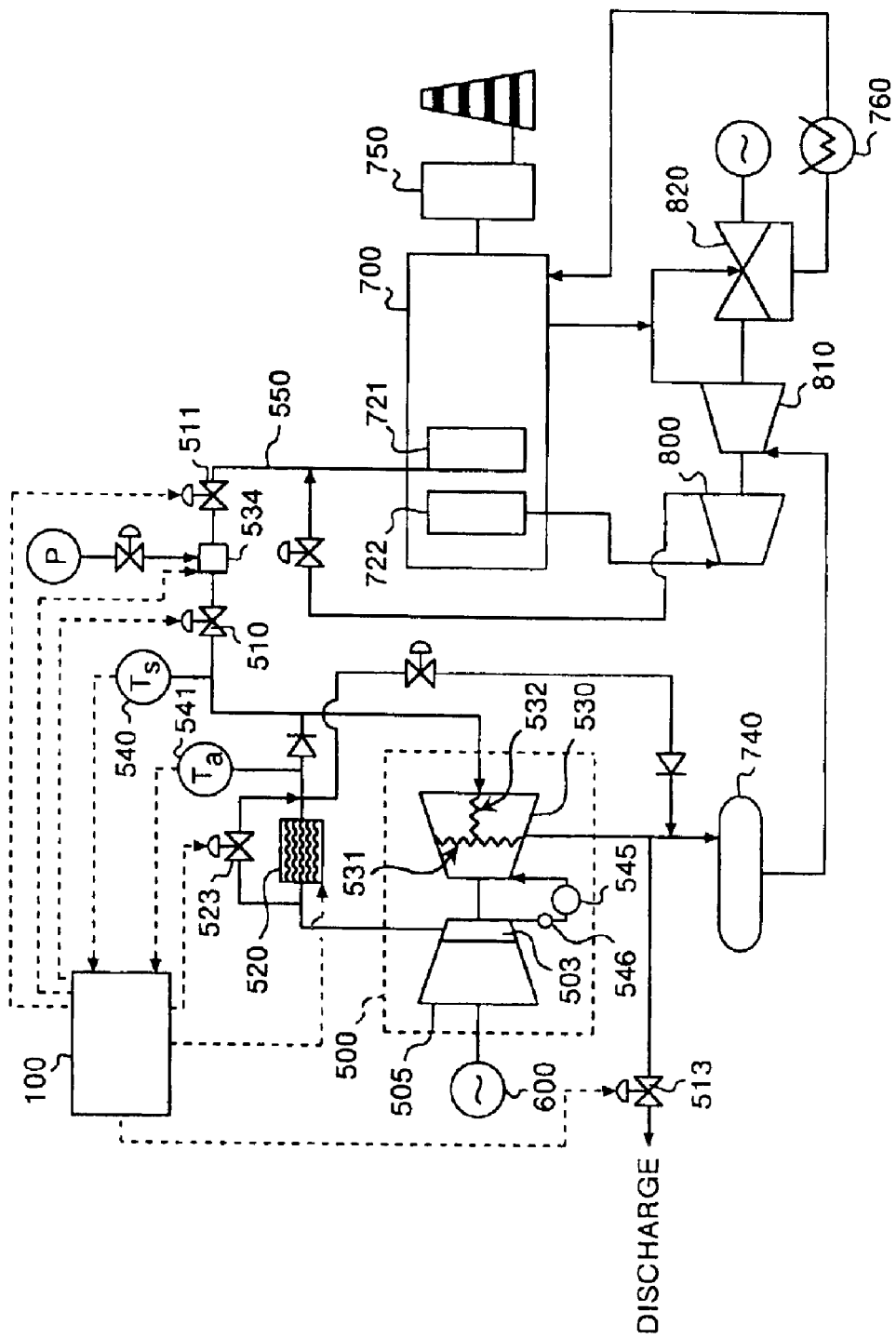
FIG. 10 is an explanatory diagram which shows a case such that the gas turbine of the invention is applied to a gas turbine combined electric power generation plant.

FIG. 10 is an explanatory diagram which shows a case such that the gas turbine of the invention is applied to a gas turbine combined electric power generation plant. This gas turbine combined electric power generation plant is such that it includes a gas turbine using a steam cooling system for a high temperature member such as a moving blade and a stationary blade, and when the cooling medium of the moving blade is switched from casing air to steam, temperatures of both are equalized.

A gas turbine 500 includes a compressor 505, a combustor 546 and a turbine 530. High temperature and high pressure air compressed by the compressor 505 is introduced into the combustor 546. In the combustor 546, gas fuel such as natural gas or liquid fuel such as light oil and light heavy oil is injected to this high temperature and high pressure air to burn them, and high temperature combustion gas is generated. The combustion gas passes through a combustor receiver 545 and is injected to the turbine 530, and the thermal energy of the high temperature and high pressure combustion gas is converted into rotation energy in the turbine 530. The compressor 505 is driven by the rotation energy, the electric generator 600 is driven by remaining rotation energy driven the compressor 505 to generate electric power.

The gas turbine 500 is actuated by an electric generator 600 and then is accelerated, the gas turbine is brought into a constant speed operation at constant rotation number (3000 or 3600 rpm), and warms a moving blade 531, a turbine main shaft 532 and the like by casing air bled from the casing 503. The moving blade 531 and the HP-SH 721 are connected to each other through a pipe 550 which supplies steam to a moving blade 531 as a high temperature member, and after the warming up operation, cooling medium of the moving blade 531 is switched from casing air to high pressure steam of the HP-SH 721. At that time, temperatures of the casing air and the high pressure steam are equalized, more specifically, a temperature difference therebetween is set within 10° C. and then, the cooling medium is switched. A manner to set the temperature difference therebetween within 10° C. is as described above, i.e., a TCA cooler 520 or a water injecting spray 534 is actuated by a control apparatus 100, thereby setting the temperature difference therebetween within 10° C. When the temperature difference therebetween becomes within 10° C., pressure adjusting valves 511, 510, 513 and the like are opened and closed to switch the cooling medium to high pressure steam.

With this gas turbine combined electric power generation plant, when the cooling medium of the moving blade 531 is switched from the casing air to the high pressure steam, temperatures thereof are equalized. With this, it is possible to suppress the shaft vibration of the entire rotor system including the turbine main shaft 532 and the rotor disk within the permissible value. Therefore, when the cooling of the moving blade 531 is switched, since a danger of the trip of the gas turbine can be minimized, the gas turbine can be operated stably. As a result, a danger that the gas turbine combined electric power generation plant itself is stopped can be minimized, and it is possible to stably supply the electric power. Further, when the trip of the gas turbine is once generated in the gas turbine combined electric power generation plant, the plant itself is stopped, and it takes a time for again starting the plant and thus, the start of the entire plant is delayed, and electricity can not be supplied in time for the peak of the electric power consumption sometimes. With this gas turbine combined electric power generation plant, since the trip of the gas turbine is suppressed to the minimum, it is possible to operate the plant as planned and as a result, the electric power can stably be supplied.

(Fourth Embodiment)

Figure 11:
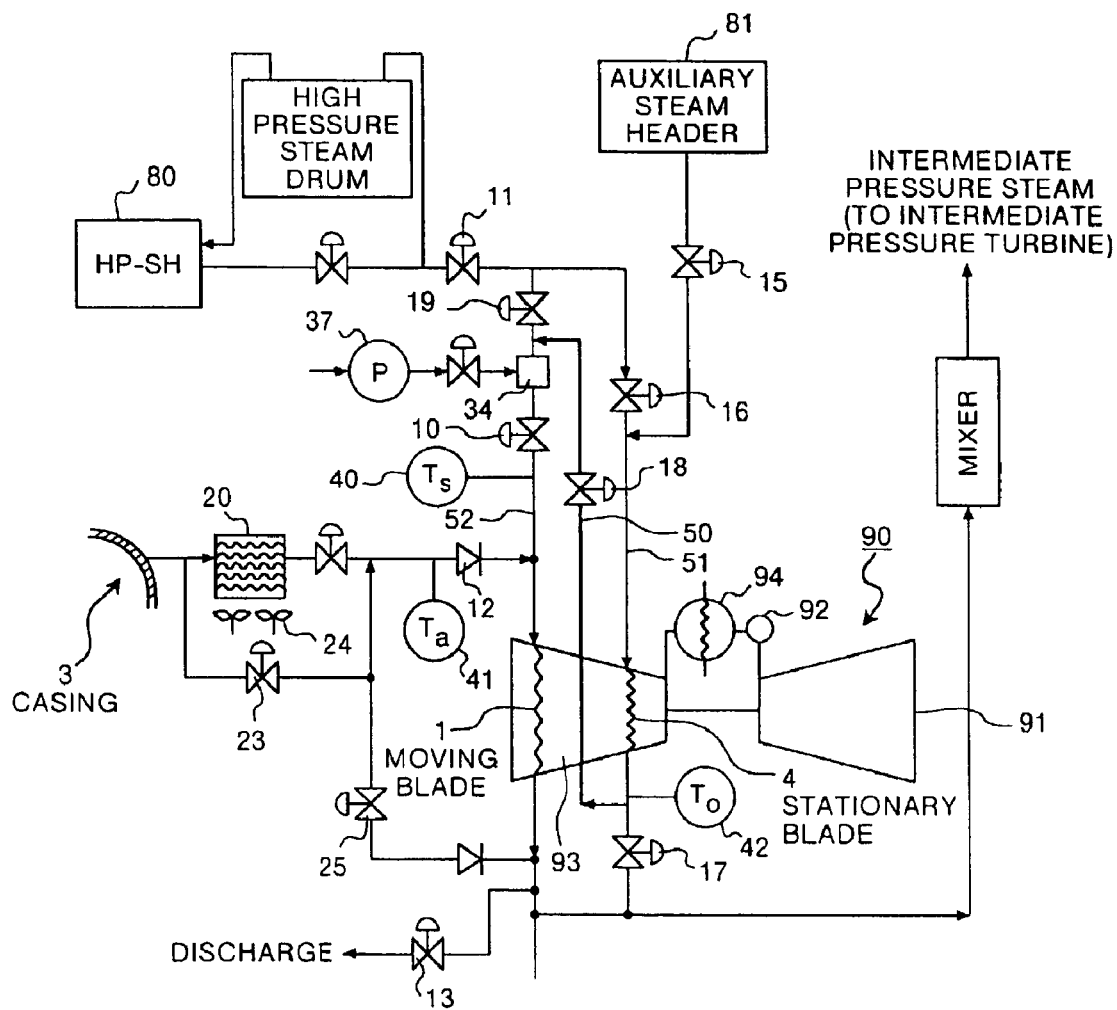
FIG. 11 is an explanatory diagram which shows a cooling system of a gas turbine of a fourth embodiment of the invention.

FIG. 11 is an explanatory diagram which shows a cooling system of a gas turbine of a fourth embodiment of the invention. This gas turbine is such that steam which is already used to cool a stationary blade 4 as a high temperature member of the gas turbine is used for cooling a moving blade 1. According to this gas turbine of the first embodiment, independent steam supply systems are provided for the moving blade and the stationary blade to cool them. Further, for a while after the gas turbine is started, it is necessary to warm up the rotation system such as the moving blade, the turbine main shaft and the rotor disk by air supplied from the casing 3 of the gas turbine.

At that time, a temperature of the casing air supplied from the casing 3 is about 400° C. On the other hand, since no load is applied to the gas turbine when the moving blade and the like are warmed up, a temperature the exhaust gas is as low as 300° C. as compared with a case such that a rating load is applied to the gas turbine. Further, since the HRSG can not be form steam having a temperature higher than the exhaust gas of the gas turbine, a temperature of steam of the HP-SH 80 is about 300° C. As described above, in the gas turbine of the first embodiment, there is a temperature difference of about 100° C. between the casing air and the steam. As already explained, when the cooling medium is switched from the casing air to the steam, it is necessary to equalize the temperatures of the casing air and the steam. In the gas turbine of the first embodiment, since it is necessary suppress the temperature difference therebetween less than 10° C., the casing air is cooled to about 10° C. by the TCA cooler 20.

In the gas turbine of the first embodiment, energy is required to cool the casing air. Further, since the casing air is cooled before it is used all the way, it takes time to warm the moving blade 1 and the like, and fuel is wastefully used correspondingly. Therefore, in the gas turbine 90 of the first embodiment, there is a problem that costs required from a time point when the gas turbine 90 is started to a time point when the rating output can be obtained are increased.

The gas turbine of the fourth embodiment has been accomplished to solve this problem, and steam which is already used to cool the stationary blade 4 is further used for cooling the moving blade 1 as shown in FIG. 11. Next, the gas turbine 90 of the fourth embodiment will be explained. The gas turbine 90 includes a compressor 91, a combustor 92 and a turbine 93. The turbine 93 includes a moving blade 1 and a stationary blade 4, and steam or air cools them. A combustor receiver 94 of the gas turbine 90 is also cooled by steam.

According to the gas turbine 90, steam which is already used to cool the stationary blade 4 as a high temperature member of the gas turbine 90 is further used for cooling the moving blade 1. The stationary blade 4 is provided at its cooling flow passage inlet with a pipe 51 which supplies steam to be used for cooling. A supply source of steam supplied to the stationary blade 4 is switched to high pressure steam of the HP-SH 80 included in the HRSG (not shown) from an auxiliary steam header 81 by switching the valves 15 and 16.

The cooling flow passage outlet of the stationary blade 4 is provided with a connecting pipe 50. One end of the connecting pipe 50 is connected to a pipe 52 which supplies steam to the cooling flow passage of the moving blade 1. Steam which is already used to cool the stationary blade 4 is supplied to the moving blade 1. The connecting pipe 50 is connected to an upstream of the water injecting spray 34 included in the pipe 52. When a temperature of steam which is already used to cool the stationary blade 4 is high, water is injected from the water injecting spray 34 to lower the steam temperature to be supplied to the moving blade 1.

After the gas turbine 90 is started and its speed is increased, when the gas turbine is brought into a constant speed operation, the moving blade 1 is warmed up by casing air supplied to the casing 3 of the gas turbine. Since the casing air temperature is about 400° C., the temperature is lowered by the TCA cooler 20 immediately after the start of the gas turbine to warm up the moving blade 1 and the like. Like a case of cold start, when high temperature casing air is supplied when a temperature of the moving blade 1 or the like is low, unconformity is generated in the moving blade 1 or the like sometimes. Therefore, casing air cooled by the TCA cooler 20 is supplied immediately after the gas turbine is started, and as the gas turbine is warmed up, casing air having high temperature is gradually supplied. This temperature can be adjusted by varying an amount of air passing through the TCA cooler 20 by the flow-rate adjusting valve 23, or by varying the number of or the number of rotation of cooling fans 24 of the TCA cooler 20. Finally, casing air of about 400° C. is directly supplied to the moving blade 1 or the turbine main shaft (not shown) to warm them.

When the warming up operation is completed, the cooling medium of the moving blade 1 is switched from the casing air to steam. Here, since a temperature of the exhaust gas of the gas turbine at the time of the constant speed operation is about 300° C., a temperature of steam formed by the HP-SH 80 can not be increased further. Therefore, as long as the high pressure steam of the HP-SH 80 included in the HRSG is used, steam having a temperature higher than this can not be obtained. However, this gas turbine 90 uses steam which is already used to cool the stationary blade 4, instead of the high pressure steam of the HP-SH 80. Steam which cools the stationary blade 4 is about 300° C., and is supplied to the cooling flow passage in the stationary blade 4, heat exchange is carried out while the steam passes through the cooling flow passage and is discharged from the outlet of the cooling flow passage. A temperature of this steam at that time is about 400° C. However, when the steam which is already used to cool the stationary blade 4 is used, it is possible to obtain steam whose temperature is higher than that of the exhaust gas of the gas turbine 90. Further, since the moving blade 1 is warmed up to about 400° C. by the casing air as described above, which is about the same temperature of the steam which is already used to cool the stationary blade 4, it is possible to smoothly switch the cooling medium of the moving blade 1.

The steam which is already used to cool the stationary blade 4 may be supplied to the auxiliary steam header 81 or from the HP-SH 80. When the steam is supplied from the HP-SH 80, since it is not possible to generate steam having a temperature equal to or higher than 300° C. during the warming up operation, a temperature of steam supplied therefrom is about 300° C. However, after the steam cooled the stationary blade 4, its temperature is increased by about 100° C., its temperature is about the same as the casing air temperature.

When the cooling medium of the moving blade 1 is switched from the casing air to the steam, it is necessary to equalize both the temperatures. This is because that when the temperature difference between the casing air and the steam is great when the cooling medium of the moving blade 1 is switched, the shaft vibration generated in the turbine main shaft of the gas turbine 90 becomes too large, and the shaft vibration exceeds the permissible value sometimes. When the shaft vibration of the turbine main shaft exceeds the permissible value, further driving is danger and thus, the operation of the gas turbine 90 is stopped (trip). The shaft vibration of the turbine main shaft is generated when a temperature distribution is generated in the circumferential direction of the turbine main shaft, or when a temperature distribution is generated in the circumferential direction of the rotor disk connected to the turbine main shaft.

When both the temperatures of the casing air and steam to be switched, the temperature distribution is reduced, and the shaft vibration of the turbine main shaft can be suppressed lower than the permissible value. When the temperature difference therebetween in the actual operation is within 15° C., it is possible to suppress the shaft vibration of the turbine main shaft within the permissible value. However, the shaft vibration value under the condition that the temperature difference is within 15° C. is close to the tolerance limit. Therefore, in order to switch the cooling medium more stably, it is preferable set the temperature difference between the casing air and the steam within 12 to 13° C., and when safety is further taken into consideration, it is preferable set the temperature difference within 10° C.

Casing air temperature Ta and steam temperature To which are already used to cool the stationary blade 4 are respectively measured by the thermometers 41 and 42, and when the temperature difference therebetween becomes within 10° C., the valve 17 is closed and the valve 18 is opened, thereby switching the cooling medium. Here, by adjusting the steam pressure adjusting valve 19, the pressure is adjusted such that a pressure of the steam which is already used to cool the stationary blade 4 becomes lower than a pressure of the steam of the HP-SH 80 downstream the steam pressure adjusting valve 19. By adjusting in this manner, the high pressure steam of the HP-SH 80 passes through the steam pressure adjusting valve 19 and does not flow through the moving blade 1. In a state in which the steam pressure adjusting valve 19 is closed, the high pressure steam of the HP-SH 80 may pass through the steam pressure adjusting valve 19 so that the high pressure steam does not flow through the moving blade 1. The casing air temperature Ta is cooled by the TCA cooler 20, the steam temperature To which is already used to cool the stationary blade 4 cooled by steam by means of the water injecting spray 34 so that both the temperatures fall within the temperature range. For controlling the temperature, the temperature control method explained in the first embodiment can be applied.

When the casing air temperature Ta and the steam temperature to which is already used to cool the stationary blade 4 fall within the range, the cooling medium is switched to the steam which is already used to cool the stationary blade 4. In this gas turbine 90, since a temperature of the casing air and a temperature of the steam which is already used to cool the stationary blade 4 are both about 400° C., the cooling medium can be switched without adjusting the temperature almost at all. Therefore, time is not required for switching the cooling medium, and the starting loss can be reduced.

In the gas turbine 90, steam which is already used to cool the stationary blade 4 is also used for cooling the moving blade 1. Therefore, as compared with the gas turbine of the first embodiment in which the stationary blade 4 and the moving blade 1 are provided with independent steam supply systems to supply the cooling steam, the amount of steam can be reduced by half. Thus, the starting loss can be reduced correspondingly. Further, since only one half of steam is consumed as compared with the conventional technique, it is unnecessary to provide a high pressure steam drum (see FIG. 11) required for supplying a large amount of steam. Therefore, the structure of the plant can be simplified, labor for maintaining and inspects high pressure steam drum becomes unnecessary, and it is possible to maintain the plant more simply than the conventional technique.

Further, in the gas turbine 90, when the cooling medium is switched from the casing air to the steam which is already used to cool the stationary blade 4, since the moving blade 1 and the like are already warmed up to 400° C., it is unnecessary to take time for the subsequent warming up operation. Furthermore, since the casing air is not cooled and directly supplied to the moving blade 1 and the like to warm the same at the final stage of warming up operation, it is unnecessary to operate the TCA cooler 20 which cools the casing air, and the starting loss can be reduced correspondingly.

In this gas turbine 90, a period during which the moving blade 1 is cooled using steam which is already used to cool the stationary blade 4 which is high temperature member is preferably a driving period before the gas turbine 90 is connected to the electric generator. A reason thereof will be explained next. Until the gas turbine 90 is connected to the electric generator, no load is applied to the gas turbine 90. Therefore, the operational state of the gas turbine 90 is substantially constant, and the exhaust gas temperature is not varied almost at all. A temperature of the steam which is already used to cool the stationary blade 4 at about 300° C. becomes about 400° C. when it cooled the stationary blade 4. During the cooling operation of the moving blade 1 until the gas turbine 90 is connected to the electric generator, it is necessary to supply the cooling medium to the moving blade 1 at about 400° C. Therefore, before the gas turbine 90 is connected to the electric generator, the steam which is already used to cool the stationary blade 4 can be used for cooling the moving blade 1 without adjusting a temperature of the steam almost at all.

However, after the gas turbine 90 is connected to the electric generator, since a load is applied to the gas turbine 90, much fuel is supplied to the gas turbine 90, and output corresponding to this load is taken out. Therefore, as compared with the case before the gas turbine 90 is connected to the electric generator, the operational state of the gas turbine 90 is varied, a temperature of the cooling medium supplied to the stationary blade 4 or the moving blade 1 is also varied, and the exhaust gas temperature is also increased. Therefore, a temperature of the steam which is already used to cool the stationary blade 4 and a temperature of the steam to be supplied to the moving blade 1 are different from each other sometimes. Thus, in order to adjust both the temperatures, it is necessary adjust the steam temperature to a temperature supplied to the moving blade 1 by lowering the temperature by injecting water to steam which is already used to cool the stationary blade 4, or increasing the temperature by mixing the steam with high temperature steam. Thus, as compared with a case before the gas turbine is connected to the electric generator, labor and energy are required for adjusting the temperature of steam, when the steam which is already used to cool the stationary blade 4 is used for cooling the moving blade 1, it is preferably used before the gas turbine 90 is connected to the electric generator.

Although the steam which is already used to cool the stationary blade 4 is supplied to the moving blade 1, since the temperature condition of the moving blade 1 is varied depending upon load of the gas turbine 90, the moving blade 1 may be cooled by steam which is already used to cool the combustor 92 or combustor receiver 94 in this case. Further, steam which is already used to cool the combustor receiver 94 and steam which is already used to cool the stationary blade 4 may be mixed and they may be supplied to the moving blade 1. In this case, steam having temperature which is more suitable for cooling the moving blade 1 can be supplied to the moving blade 1, which is preferable.

(Modification)

Figure 12:
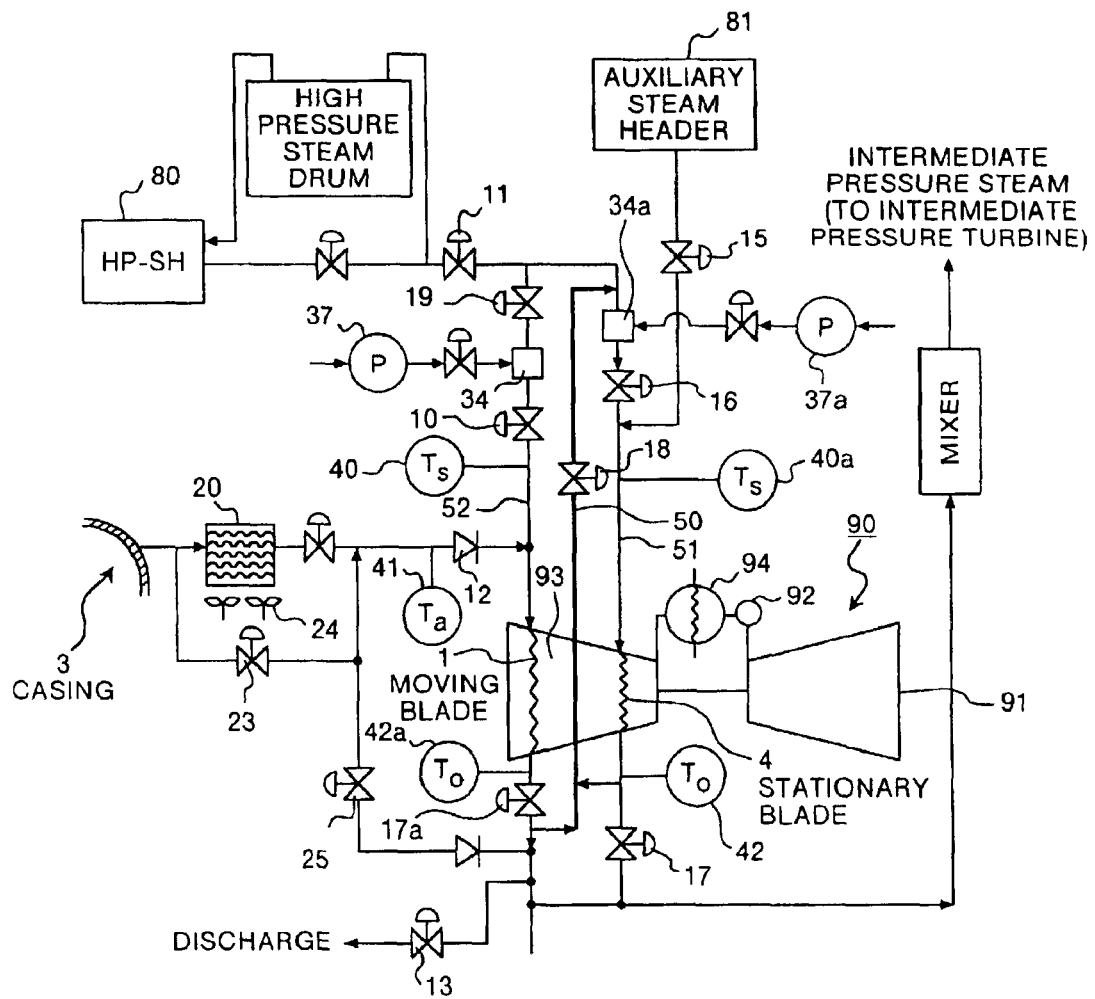
FIG. 12 is an explanatory diagram which shows a cooling system of the gas turbine of the fourth embodiment.

FIG. 12 is an explanatory diagram which shows a cooling system of the gas turbine of the fourth embodiment. This gas turbine is such that steam which is already used to cool a moving blade which is a high temperature member of the gas turbine is used for cooling a stationary blade. Although it is not apparent from FIG. 12, the stationary blade 4 is provided therein with a flow passage through which cooling steam passes, and when the steam flows through the cooling flow passage, the stationary blade 4 heated by the combustion gas is cooled.

Steam supplied from the HP-SH 80 to the moving blade 1 cools the moving blade 1, and then is supplied to upstream of the stationary blade 4 through the valves 17*a* and 18. Water is injected into this steam when necessary by a water injecting spray 34*a* based on information of a thermometer 40*a* provided in an inlet of the stationary blade 4 to adjust the temperature of the steam. Thereafter, the steam is supplied to the cooling flow passage provided in the stationary blade 4 to cool the stationary blade 4. The steam which is already used to cool the stationary blade 4 passes through the valve 17 and is introduced to a mixer, thereby driving an intermediate pressure steam turbine (not shown). According to this gas turbine 90, since the steam which is already used to cool the moving blade 1 is also used for cooling the stationary blade 4, the amount of steam onsumed can be reduced.

Steam which is already used to cool the combustor 92 or the combustor receiver 94 is suitable for cooling the stationary blade 4 depending upon a state of load sometimes. In such a case, steam which is already used to cool the combustor receiver 94 and the like may be introduced upstream of the water injecting spray 34a and may be supplied to the stationary blade 4 in the same manner as that explained above. Steam which is already used to cool the moving blade 1 and steam which is already used to cool the combustor receiver 94 or the like may be mixed and temperatures thereof may be adjusted and then, the steam may be supplied to the stationary blade 4. With this, a temperature of steam to be supplied to the stationary blade 4 can be adjusted more finely and thus, a danger of thermal shock and the like can lowered, which is preferable.

(Fifth Embodiment)

Figure 13:
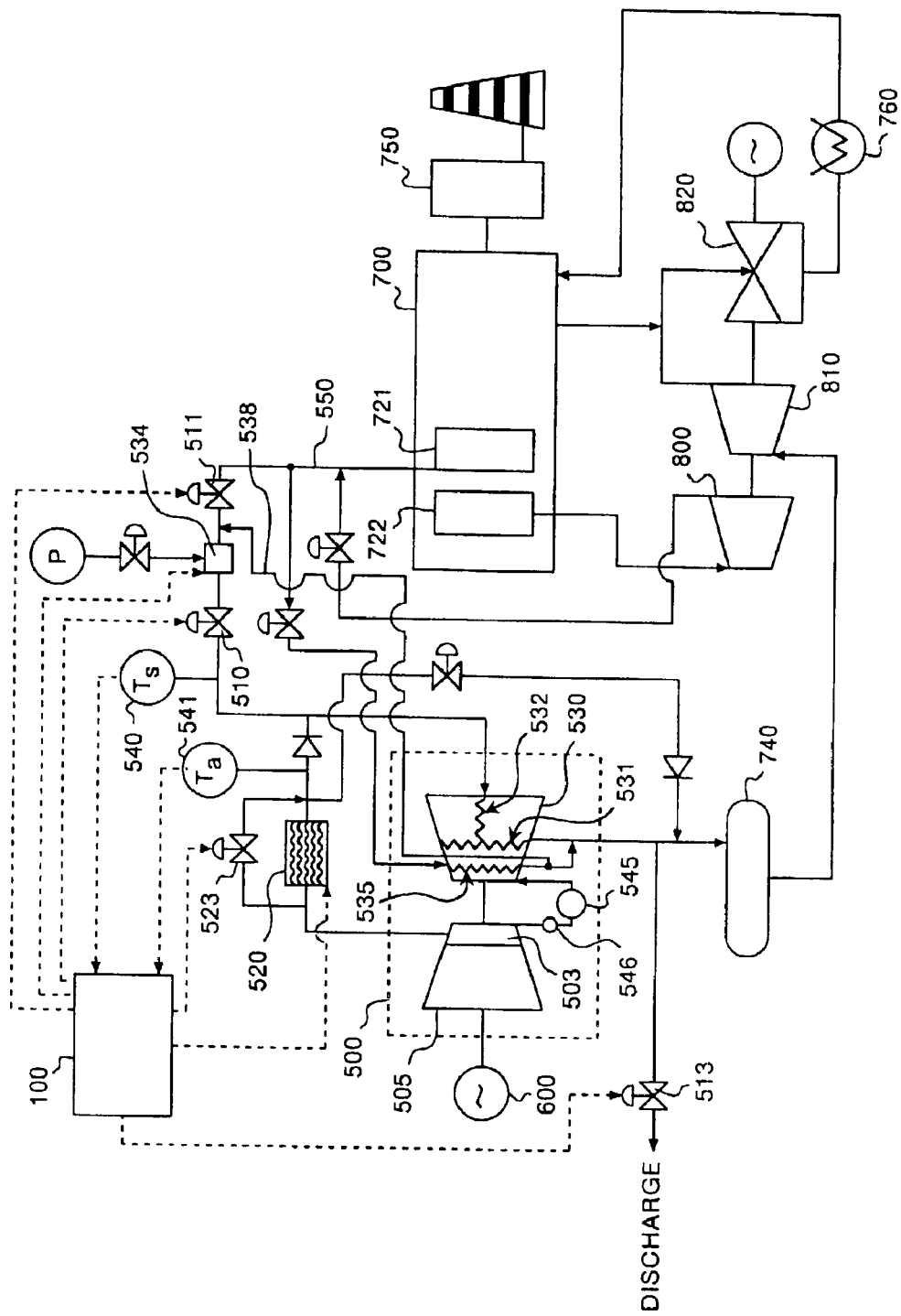
FIG. 13 is an explanatory diagram which shows a gas turbine combined electric power generation plant of a fifth embodiment of the invention.
Figure 14:
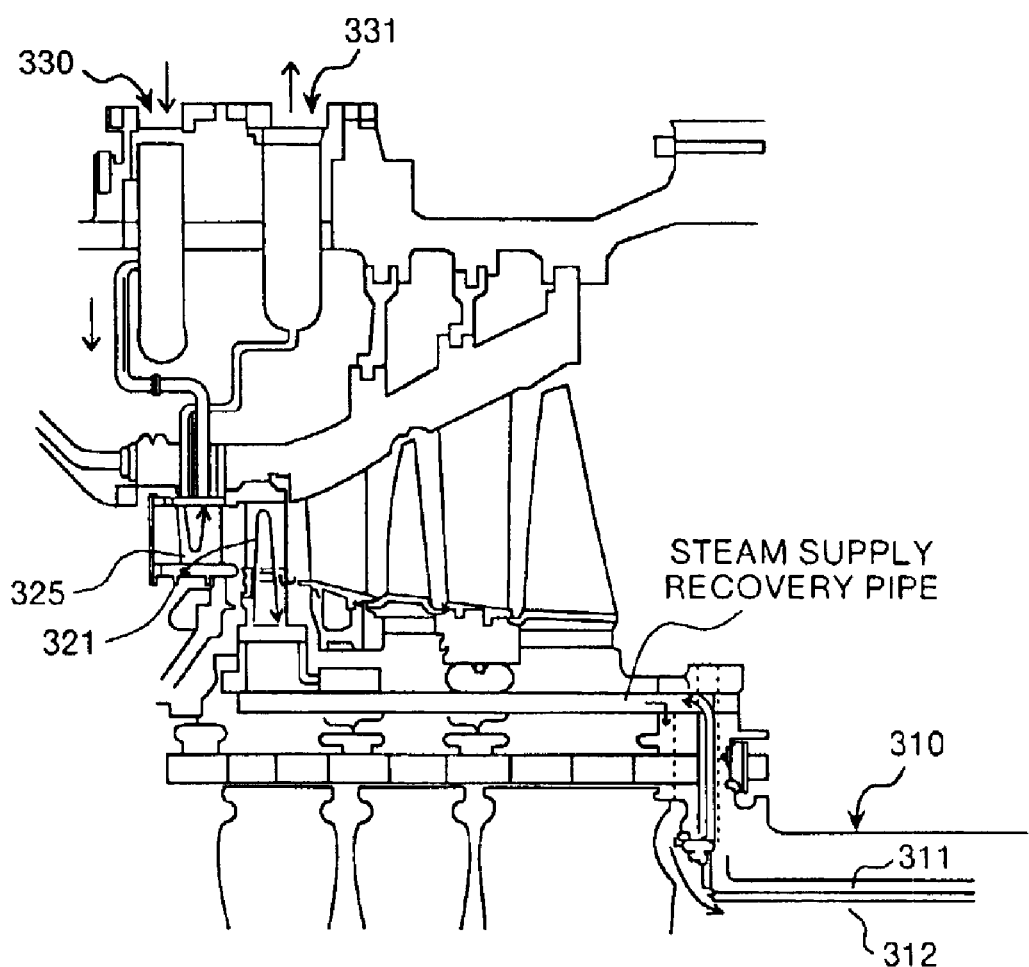
FIG. 14 is a partial sectional view of a gas turbine in which a steam cooling method is applied to a moving blade and a stationary blade.
Figure 15:
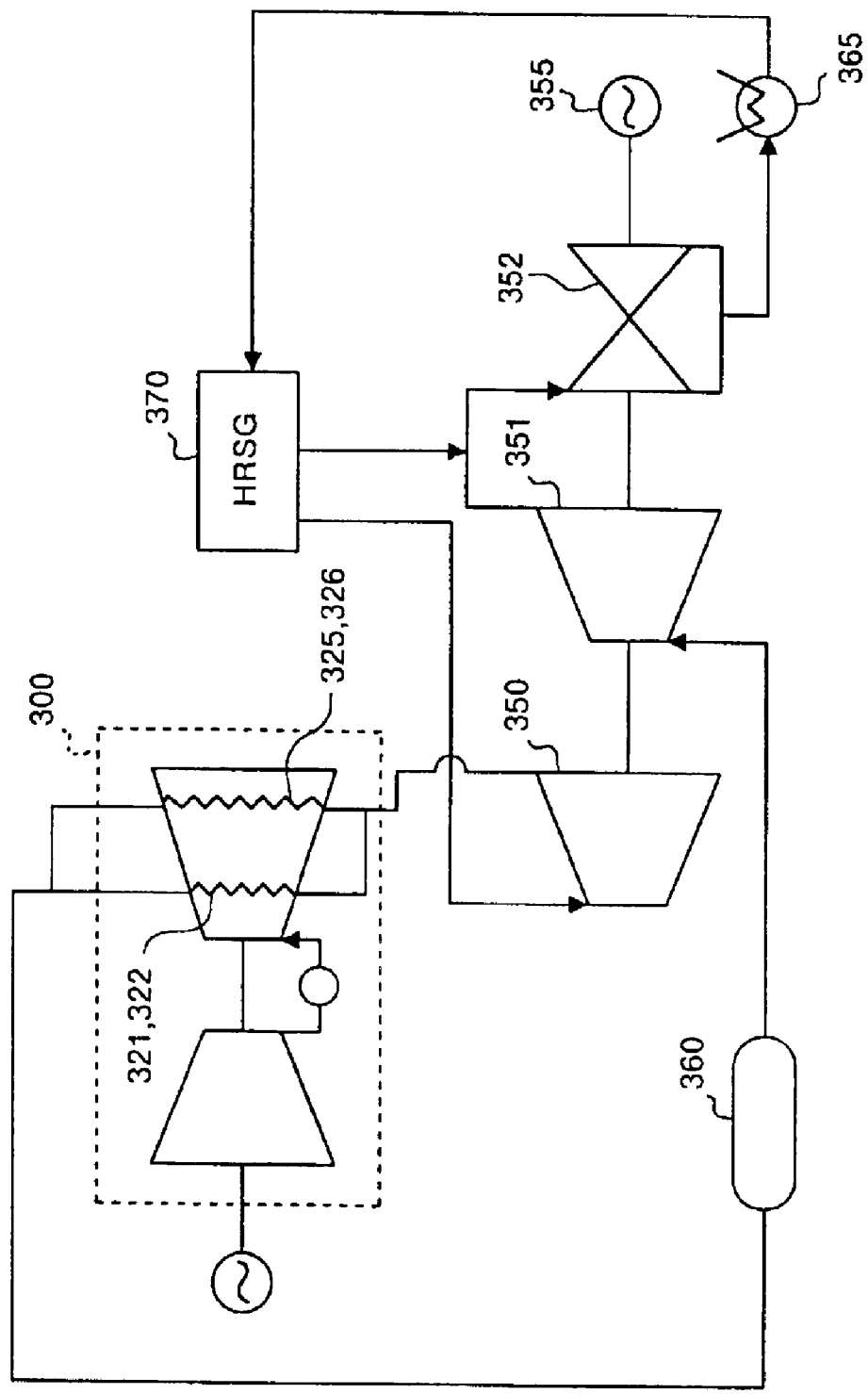
FIG. 15 is a schematic diagram which shows a gas turbine combined plant in which the steam cooling method is employed in a high temperature part.

FIG. 13 is an explanatory diagram which shows a gas turbine combined electric power generation plant of a fifth embodiment of the invention. This gas turbine combined electric power generation plant includes the gas turbine explained in the fourth embodiment using the steam cooling system for a high temperature member such as the moving blade and the stationary blade. The gas turbine combined electric power generation plant is such that steam which is already used to cool the stationary blade is also used for cooling the moving blade.

This gas turbine 500 includes a compressor 505, a combustor 546 and a turbine 530. High temperature and high pressure air compressed by the compressor 505 is introduced into the combustor 546. In the combustor 546, gas fuel such as natural gas or liquid fuel such as light oil and light heavy oil is injected to this high temperature and high pressure air to burn them, and high temperature combustion gas is generated. The combustion gas passes through a combustor receiver 545 and is injected to the turbine 530, and the thermal energy of the high temperature and high pressure combustion gas is converted into rotation energy in the turbine 530. The compressor 505 is driven by the rotation energy, the electric generator 600 is driven by remaining rotation energy driven to the compressor 505 to generate electric power.

The gas turbine is actuated by an electric generator 600 and then is accelerated, the gas turbine is brought into a constant speed operation at constant rotation number (3000 or 3600 rpm), and warms a moving blade 531, a turbine main shaft 532 and the like by casing air bled from the casing 503. The stationary blade 535 and the moving blade 531 are connected to each other through a pipe 538 which introduces steam which is already used to the stationary blade 535 to the moving blade 531. After the warming up operation by the auxiliary steam is completed, the stationary blade 535 switches the cooling medium of the moving blade 531 from the casing air to high pressure steam of the HP-SH 721. At that time, temperatures of the casing air and the high pressure steam are equalized, more specifically, a temperature difference therebetween is set within 10° C. and then, the cooling medium is switched. A manner to set the temperature difference therebetween within 10° C. is as described above, i.e., a TCA cooler 520 or a water injecting spray 534 is actuated by a control apparatus 100, thereby setting the temperature difference therebetween within 10° C. When the temperature difference therebetween becomes within 10° C., pressure adjusting valves 511, 510, 513 and the like are opened and closed to switch the cooling medium to high pressure steam.

According to this gas turbine combined electric power generation plant, since the steam which is already used to cool the stationary blade 535 is also used for cooling the moving blade 531 and thus, the using amount of steam can be reduced by half. At the time of completion of the warming up operation, a temperature of the steam which is already used to cool the stationary blade 535 is substantially equal to a temperature of the casing air used for cooling the moving blade 531. Therefore, when the cooling medium of the moving blade 531 is switched to the steam after cooling the stationary blade, the cooling medium can be switched without adjusting the temperature almost at all.

Therefore, it is unnecessary to use the casing air before using when the moving blade 531 or the turbine main shaft 532 is warmed up. Therefore, energy required for cooling the element can be saved. Further, the warming up operation can be carried out with a higher temperature as compared with the conventional technique, it is possible to shorten the time required for the start to the rating operation of the gas turbine 500. With such effect, the starting loss can be suppressed lower in the gas turbine 500 as compared with the conventional gas turbine.

Since the time required from the start to the rating load can be shortened, operation in accordance with electric demand becomes easy. Further, since the moving blade 531 and the turbine main shaft 532 can be warmed up at the casing air temperature higher than the conventional technique, it is possible to reduce a danger causing condensation of steam even when the cooling medium is switched from the casing air to steam. Therefore, since vibration ascribable to disorder of rotation balance due to condensation can be reduced, the gas turbine can be operated stably which suppressing the trip of the gas turbine.

As explained above, according to the gas turbine of this embodiment, when the cooling medium which cools the high temperature member of the gas turbine such as the moving blade is switched to the steam, temperatures of the casing air and the steam are equalized, and the cooling medium is switched by a switching unit such as a valve. Therefore, since the temperature distribution in the circumferential direction generated in the turbine main shaft can be reduced, the shaft vibration of the entire rotor system including the turbine main shaft and the rotor disk can be contained within the permissible value. With this, since the trip of the gas turbine at the time of switch of the cooling medium, the gas turbine can be operated reliably and stably.

According to the gas turbine of this embodiment, when the cooling medium is switched from the casing air to steam, water is injected to the steam to adjust a temperature of the steam, and temperatures of the casing air and the steam are equalized. When water is injected to steam, the temperature of the steam is abruptly reduced and thus, it is possible to swiftly equalize the temperatures of the casing air and the steam. As a result, it does not take long time for adjusting the temperature, the gas turbine can proceed to the rating operation within a shorter time, and the starting loss can be reduced.

According to the gas turbine of this embodiment, when the casing air temperature and the steam temperature are equalized, the temperatures are equalized by at least one of the air temperature adjusting unit and the water-injecting unit which adjusts the steam temperature. Therefore, since the casing air temperature and the steam temperature can be equalized by selecting or using the air temperature adjusting unit and the water-injecting unit, it is possible to equalize both the temperatures without waiting until the steam temperature becomes higher than the casing air temperature. As a result, it is possible to shorten the time required for proceeding to the rating operation, and the starting loss can also be reduced. Further, when the casing air temperature and the steam temperature are equalized using both the air temperature adjusting unit and the water-injecting unit, both the temperatures can be equalized more swiftly and thus, the rating operation can be achieved more quickly and the starting loss can be suppressed lower.

According to the gas turbine of this embodiment, the cooling medium is switched from the casing air to the steam when the temperature difference between the casing air and the steam becomes within 15° C. Therefore, it is unnecessary to completely equalize the casing air temperature and the steam temperature and thus, the cooling medium can correspondingly be switched quickly. As a result, the rating operation can be achieved faster and the starting loss can be reduced.

According to the gas turbine of this embodiment, steam which is already used to cool the stationary blade of the gas turbine is used for cooling another high temperature member such as the moving blade. Therefore, the cooling medium can be switched to steam in a state in which the casing air temperature and the steam temperature are substantially equal to each other. Therefore, it is unnecessary to cool the casing air almost at all. As a result, energy for cooling the casing air becomes unnecessary almost at all and thus, the starting loss can be reduced correspondingly.

According to the gas turbine of this embodiment, steam which is already used to cool the high temperature member of the gas turbine which needs to be cooled such as the stationary blade and the combustor receiver can be used for cooling the moving blade and the combustor which are the high temperature member and which also needs to be cooled. Therefore, the steam which is already used to cool the high temperature member can be used for cooling other high temperature parts, the using amount of steam can be reduced correspondingly, and the starting loss can be reduced. Further, steam can be supplied in accordance with a temperature level of the high temperature member which is cooled and thus, labor for temperature adjustment can be reduced.

According to the gas turbine of this embodiment, steam which is already used to cool another high temperature member such as the stationary blade of the gas turbine is used for cooling the moving blade. Therefore, it is unnecessary to separately supply steam to the moving blade and the stationary blade and thus, the consumption amount of the cooling steam can be reduced by half as compared with the conventional technique. When the cooling medium for the moving blade is switched from the casing air to steam which is already used to cool the stationary blade, it is possible to switch the cooling medium without adjusting both the temperatures almost at all. Therefore, it is possible to reduce the energy and labor required for adjusting the temperature as compared with the conventional technique. Further, since the part can be warmed up at a temperature higher than the conventional technique, time required from a time point when the gas turbine is started to a time point when the gas turbine is brought into the rating operation can be shortened. With the effect, starting loss of the gas turbine can be reduced as compared with the conventional technique.

According to the gas turbine of this embodiment, since the steam which is already used to cool the moving blade is used for cooling the stationary blade, it is unnecessary to supply the cooling steam to the stationary blade and the moving blade independently. As a result, the consumption amount of the cooling steam can be reduced by half as compared with the conventional technique and thus, the starting loss can be reduced correspondingly.

According to the gas turbine of this embodiment, when the cooling medium for the moving blade is switched from the casing air temperature to steam which is already used to cool the high temperature member of the gas turbine, the cooling medium is switched after both the temperatures are equalized. Therefore, it is possible to contain the shaft vibration at the time of switch of the cooling medium within the permissible value and thus, the gas turbine can be operated stably without generating the trip of the gas turbine.

According to the gas turbine of this embodiment, before the gas turbine is connected to the electric generator, steam which is already used to cool the stationary blade and the other high temperature member is used as cooling medium for the moving blade. The steam which is already used to cool the stationary blade can be used as the cooling medium for the moving blade without adjusting the temperature almost at all. Therefore, it is possible to switch the cooling medium swiftly without requiring labor for adjusting the temperature. With this, it is possible to shorten the time required from a time point when the gas turbine is started to a time point when the gas turbine is brought into the rating load operation and thus, the starting loss can be reduced.

According to the control apparatus of this embodiment, at least one of the air temperature adjusting unit which adjusts the casing air temperature and the water-injecting unit which adjusts the steam temperature is controlled to equalize the casing air temperature and the steam temperature. Therefore, the casing air temperature and the steam temperature can be equalized by selecting or using the air temperature adjusting unit and the water-injecting unit and thus, it is possible to equalize both the temperatures without waiting until the steam temperature is brought higher than the casing air temperature and thus, the turbine can proceed the rating operation faster correspondingly, and the starting loss can be reduced.

According to the driving method of the gas turbine of this embodiment, when the casing air temperature and the steam temperature are equalized, both the temperatures are equalized by adjusting the air temperature adjusting unit. When the steam temperature is lower than the casing air temperature when the cooling medium is switched, the casing air temperature and the steam temperature can not be equalized by adjusting the steam temperature. According to this driving method, however, since the casing air temperature is adjusted, the casing air temperature and the steam temperature can be equalized irrespective of the steam temperature. Further, according to the computer program of this embodiment, the driving method of the gas turbine can be realized using the computer by the program for allowing the computer to execute the driving method of the gas turbine.

According to the driving method of the gas turbine of this embodiment, when the casing air temperature and the steam temperature are equalized, both the temperatures are equalized by the water-injecting unit which adjusts the steam temperature. Therefore, the casing air temperature and the steam temperature can swiftly be equalized and the starting loss can be reduced. Further, according to the computer program of this embodiment, the driving method of the gas turbine can be realized using the computer by the program for allowing the computer to execute the driving method of the gas turbine.

According to the driving method of the gas turbine of this embodiment, when the casing air temperature and the steam temperature are equalized, both the temperatures are equalized by at least one of the air temperature adjusting unit and the water-injecting unit which adjusts the steam temperature. Therefore, the casing air temperature and the steam temperature can be equalized by selecting or using the air temperature adjusting unit and the water-injecting unit, it is possible to equalize both the temperatures without waiting until the steam temperature is brought higher than the casing air temperature and thus, the turbine can proceed the rating operation faster correspondingly, and the starting loss can be reduced. Further, according to the computer program of this embodiment, the driving method of the gas turbine can be realized using the computer by the program for allowing the computer to execute the driving method of the gas turbine.

According to the driving method of the gas turbine of this embodiment, in the gas turbine in which steam which is already used to cool been cooled the high temperature member of the gas turbine such as the stationary blade is used for cooling the moving blade, when the cooling medium of the moving blade is switched from the casing air to the steam, both the temperatures are equalized and then the cooling medium is switched. Therefore, it is possible to contain the shaft vibration of the gas turbine within the permissible value, and the gas turbine can be stably driven without generating the trip of the gas turbine. Further, since the steam which is already used to cool the stationary blade is used for cooling the moving blade, it is unnecessary independently supply the cooling steam to the moving blade and the stationary blade, the consumption amount of the cooling steam can be reduced by half as compared with the conventional technique. Further, according to the computer program of this embodiment, the driving method of the gas turbine can be realized using the computer by the program for allowing the computer to execute the driving method of the gas turbine.

According to the driving method of the gas turbine of this embodiment, the cooling medium of the moving blade is switched from the casing air to steam which is already used to cool the stationary blade before the gas turbine is connected to the electric generator. Therefore, the steam which is already used to cool the stationary blade and the like can be used as it is, no labor is required for adjusting a temperature, and it is possible to shorten the time required until the rating load driving. Further, according to the computer program of this embodiment, the driving method of the gas turbine can be realized using the computer by the program for allowing the computer to execute the driving method of the gas turbine.

The gas turbine combined electric power generation plant of this embodiment includes the gas turbine, and when the cooling medium for the high temperature member is switched, the cooling medium is switched after the casing air temperature and the steam temperature are equalized. Therefore, it is possible to suppress the trip of the gas turbine ascribable to the shaft vibration of the entire rotor system, and it is possible to drive the plant reliably and stably, and electric power can be supplied on schedule.

In this gas turbine combined electric power generation plant, steam which is already used to cool the stationary blade of the gas turbine is used for cooling the moving blade. Therefore, it is unnecessary independently supply the steam to the moving blade and the stationary blade, and the consumption amount of the cooling steam can be reduced by half as compared with the conventional technique. Further, when the cooling medium of the moving blade is switched, steam having a temperature higher than that of the conventional technique and thus, it is possible to reduce the energy required for adjusting the casing air temperature. Further, it is possible to warm up the moving blade and the like using the casing air having a temperature higher than that of the conventional technique, it is possible to shorten the time required from a time point when the plant is started to a time point when the plant is brought into the rating operation. As a result, it is possible to suppress the starting loss of the gas turbine combined electric power generation plant as compared with the conventional technique, which is economical.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine comprising:
   a high temperature member of the gas turbine which uses a gas turbine casing air and steam as cooling medium in a switching manner and which is provided therein with a cooling flow passage;
   a steam supply unit configured to supply cooling steam to the high temperature member;
   a casing air supplying unit which has an air temperature adjusting unit capable of adjusting air temperature of the gas turbine casing air supplied to the high temperature member by controlling at least one of a mixing ratio of air having different temperatures and a cooling amount of air; and
   a cooling medium switching unit which equalizes a casing air temperature and a steam temperature by the air temperature adjusting unit and then, which switches the cooling medium for the high temperature member from the casing air to the steam when a temperature difference between the casing air and the steam becomes within 15° C.

2. The gas turbine according to claim 1, wherein the cooling steam is steam which is already used to cool the stationary blade of the gas turbine.

3. A gas turbine comprising:
   a high temperature member of the gas turbine which uses a gas turbine casing air and steam as cooling medium in a switching manner and which is provided therein with a cooling flow passage;
   a steam supply unit configured to supply cooling steam to the high temperature member;
   a water-injecting unit provided between the high temperature member and the steam supply unit and which injects water to the cooling steam and adjusts at least one of a water injecting amount or a water temperature, thereby adjusting a temperature of the steam;
   an air supply unit which supplies casing air of the gas turbine to the high temperature member; and
   a cooling medium switching unit which equalizes a casing air temperature and a steam temperature by adjusting the cooling steam temperature by the water-injecting unit and then, which switches the cooling medium for the high temperature member from the casing air to the steam.

4. The gas turbine according to claim 3, wherein when a temperature difference between the casing air and the steam becomes within 15° C., the cooling medium is switched from the casing air to the steam by the cooling medium switching unit.

5. The gas turbine according to claim 3, wherein the cooling steam is steam which is already used to cool the stationary blade of the gas turbine.

6. A gas turbine comprising:
a high temperature member of the gas turbine which uses a gas turbine casing air and steam as cooling medium in a switching manner and which is provided therein with a cooling flow passage;
a steam supply unit configured to supply cooling steam to the high temperature member;
a water-injecting unit provided between the high temperature member and the steam supply unit and which injects water to the cooling steam and which adjusts at least one of a water injecting amount or a water temperature, thereby adjusting a temperature of the steam;
a casing air supply unit which has an adjusting unit capable of adjusting an air temperature of the gas turbine casing air supplied to the high temperature member by controlling at least one of a mixing ratio of air having different temperatures and an air cooling amount; and
a cooling medium switching unit which equalizes a casing air temperature and a steam temperature by controlling at least one of the water-injecting unit and the air temperature adjusting unit and then, switches the cooling medium for the high temperature member from the casing air to the steam.

7. The gas turbine according to claim 6, wherein when a temperature difference between the casing air and the steam becomes within 15° C., the cooling medium is switched from the casing air to the steam by the cooling medium switching unit.

8. The gas turbine according to claim 6, wherein the cooling steam is steam which is already used to cool the stationary blade of the gas turbine.

9. A control apparatus which switches a cooling medium supplied to a high temperature member of a gas turbine to steam, the control apparatus comprising:
a steam supply unit which supplies steam to a high temperature member of the gas turbine;
a water-injecting unit which injects water to steam to adjust a steam temperature;
an air temperature adjusting unit which controls at least one of a cooling amount of air and a mixing ratio of air having different temperatures, thereby adjusting a temperature of casing air to be supplied to the high temperature member; and
a cooling medium switching unit which switches the cooling medium for the high temperature member from the casing air to the steam,
wherein the gas turbine further comprises a processor which compares the steam temperature and the casing air temperature, and which actuates at least one of the water-injecting unit and the air temperature adjusting unit such that the steam temperature and the casing air temperature are equalized based on the comparison result, and
a control section which controls at least one of the water-injecting unit and the air temperature adjusting unit based on a signal from the processor, and actuate the cooling medium switching unit to switch the cooling medium to steam when the steam temperature and the casing air temperature are equalized.

* * * * *